(12) United States Patent
Itabashi et al.

(10) Patent No.: US 6,824,048 B1
(45) Date of Patent: Nov. 30, 2004

(54) INFORMATION TRANSMISSION SYSTEM AND METHOD

(75) Inventors: Tatsuo Itabashi, Tokyo (JP); Katsunori Hashimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 321 days.

(21) Appl. No.: 09/869,819

(22) PCT Filed: Nov. 9, 2000

(86) PCT No.: PCT/JP00/07880

§ 371 (c)(1), (2), (4) Date: Jul. 5, 2001

(87) PCT Pub. No.: WO01/35690

PCT Pub. Date: May 17, 2001

(30) Foreign Application Priority Data

Nov. 9, 1999 (JP) ............................................. 11/318487

(51) Int. Cl.[7] .............................. G06K 5/00; G06F 17/00
(52) U.S. Cl. ....................................... 235/380; 235/375
(58) Field of Search ............................... 455/11.1, 436, 455/437, 411, 414, 417; 235/375, 380, 492; 379/201.01, 201.07

(56) References Cited

U.S. PATENT DOCUMENTS

| | | |
|---|---|---|
| 5,341,410 A | 8/1994 | Aron et al. |
| 5,533,113 A | 7/1996 | Ozawa et al. |
| 5,548,637 A | 8/1996 | Heller et al. |
| 5,822,418 A | 10/1998 | Yacenda et al. |
| 5,950,135 A | 9/1999 | Cullen |
| 6,026,277 A * | 2/2000 | Gavrilovich ............... 455/11.1 |
| 6,038,442 A | 3/2000 | Ueda et al. |
| 6,125,176 A * | 9/2000 | Foladare et al. ........ 379/211.02 |
| 6,496,568 B1 * | 12/2002 | Nelson ..................... 379/88.12 |
| 6,594,493 B1 * | 7/2003 | Davies et al. ............... 455/436 |
| 6,647,263 B2 * | 11/2003 | Fujiwara ..................... 455/437 |

FOREIGN PATENT DOCUMENTS

| | | |
|---|---|---|
| EP | 0 484 067 | 5/1992 |
| EP | 0 520 194 | 12/1992 |
| JP | 11 262061 | 9/1999 |

OTHER PUBLICATIONS

Patent Abstracts of Japan vol. 1999, No. 14, Dec. 22, 1999 & JP 11 262061 A (Casio Comput Co Ltd), Sep. 24, 1999.

* cited by examiner

Primary Examiner—Diane Lee
Assistant Examiner—April Taylor
(74) Attorney, Agent, or Firm—Frommer Lawrence & Haug LLP; William S. Frommer

(57) ABSTRACT

In an information communication system and method, firstly, when individual identification information of a user that originated from a portable terminal is received by a communicating device, the individual identification information is stored and managed in connection with the communicating device, and the user is connected via the accessible communicating device on the basis of the individual identification information designated by an outside source. Secondly, the position of the user and accessible equipment to the user are managed on the basis of the individual identification information of each user that originated from the terminal and thereby, the user is provided with the predetermined information on the basis of the management information.

20 Claims, 16 Drawing Sheets

| ID No. | NUMBER OF ACCESS ROUTES | ACCESS TYPE | ACCESS ROUTE | SENSI-TIVITY LEVEL | CALL METHOD | POSITION |
|---|---|---|---|---|---|---|
| wwww | 3 | FIXED TELEPHONE | PUBLIC TELEPHONE LINES (03-5448-6112) | EXCELLENT | BELL | POSITION INFORMATION THAT CAN BE RETRIEVED BY FIXED TELEPHONE NUMBER |
| | | PORTABLE TELEPHONE | PORTABLE TELEPHONE NETWORK (0901234-5678) | GOOD | BELL | |
| | | TELEVISION | PUBLIC TELEPHONE LINES (03-5448-6112-#23-331) | PASSABLE | CALL METHOD | |
| xxxx | 0 | null | null | | | null |
| yyyy | 1 | PORTABLE TELEPHONE | PORTABLE TELEPHONE NETWORK (090-1234-5678) | GOOD | VIBRATOR | null |
| wxyz | 1 | PERSONAL COMPUTER | INTERNET (201.132.22.133:2983) | EXCELLENT | VRML | POSITION INFORMATION IN VIRTUAL SPACE |
| ...... | | ...... | ...... | | ...... | ...... |

FIG. 7

INFORMATION TRANSMISSION SYSTEM AND METHOD

TECHNICAL FIELD

The present invention relates to an information communication system and method, and for example, is suitably applied to an information communication system for, at a time of emergency due to occurrence of a disaster, specifying a person as a communication destination and communicating information corresponding to the disaster to him.

BACKGROUND ART

Conventionally, at a time of emergency, for example, when a disaster such as a leakage of radioactivity occurs at a nuclear power plant, information (for example, an evacuation order) corresponding to the disaster is reported to a general public on so-called mass media such as television broadcasting and radio broadcasting.

However, in such news reported on the mass media, it has been difficult for people in an information communicating side (hereinafter referred to as "information communicators") to communicate an evacuation order and the like corresponding to such a disaster by specifying only people who live in a target area of evacuation and have to be informed of the information.

Thus, the information communicators reports information to people including unrelated people who live outside the target are of evacuation, in a wide area, at the same time, when it is difficult to determine whether or not the people themselves living in the vicinity of the target area of the evacuation, have to evacuate, there is a possibility that some people might miss fail to evacuate.

In addition, it is difficult for the information communicator to communicate certain information to people because locations of the users are hard to be grasped.

Moreover, people might not be informed of such information unless they watch television broadcasting or listen to the radio broadcasting (unless they access media on which the information communicator reports the evacuation) even if they themselves have to be evacuated.

DISCLOSURE OF THE INVENTION

The present invention has been devised in view of the above problems, and is intended to propose an information communication system and method that are capable of remarkably improving reliability of information communication.

In order to solve the problems, the present invention provides: a terminal which is carried by a user for transmitting individual identification information of a user that is given in advance; communicating means which has a communication function for communicating with outside through a predetermined communication line, and receives the individual identification information transmitted from the terminal; and managing means for storing and managing the individual identification information, which is transmitted through a predetermined communication line from the communicating means, in connection with the communicating means when the communicating means receives the individual identification information. The managing means accesses a user through an accessible line on the basis of the individual identification information designated from outside, thereby it can certainly access, by the communicating means, the person who has informed of the individual identification information with a carried terminal by the communicating means. Thus, an information communication system which can remarkably improve the reliability of information communication can be realized.

In addition, in the present invention, an information communication method is provided with: a first step of receiving the individual identification information of the user transmitted from the terminal carried by the user, with the communicating means having the communication function for communicating with outside through a predetermined communication line; a second step of storing and managing the individual identification information which is transmitted from the communicating means through the predetermined communication line, in connection with the communicating means, when the communicating means receives the individual identification information; and a third step of accessing the user through the accessible communicating means on the basis of the individual identification information designated from the outside. Thereby, the access to the user who informed of the individual identification information with the carried terminal by the communicating means can be performed by the communicating means. Thus, an information communication method which can remarkably improve the reliability of information communication can be realized.

Further, in the present invention, the information communication system is provided with: a terminal for transmitting individual identification information of the user which is given in advance; receiving means for receiving the individual identification information transmitted from the terminal and informing a management section of the received individual identification information; and managing means provided in the management section for managing the targeted user's positions and accessible equipment to the user, on the basis of the individual identification information transmitted from the receiving means. The managing means provides the users in a designated area with predetermined information using equipment, on the basis of the user's position. Thereby, users who have to be provided with the predetermined information can be selected based on their positions and the same time, the predetermined information can be transmitted to the users using accessible equipment. Thus, an information communication system which can remarkably improve the reliability of information communication can be realized.

Furthermore, in the present invention, the information communication method is provided with: a first step of transmitting user's individual identification information which is given in advance; a second step of receiving the transmitted individual identification information and informing the management section of the received individual identification information; a third step of managing the targeted user's positions and accessible equipment to the user, on the basis of the transmitted individual identification information; and a fourth step of transmitting the predetermined information to the users in the designated area, using the equipment. Thereby, users who have to be provided with the predetermined information can be selected based on the users' positions and the same time, the predetermined information can be transmitted to the users using the accessible equipment. Thus, an information communication method which can remarkably improve the reliability of information communication can be realized.

BRIEF DESCRIPTION OF THE DRAWINGS

FIG. 7 is a list showing contents stored in a database of a user data D1 in the management section.

BEST MODE FOR CARRYING OUT THE INVENTION

Figure 1:
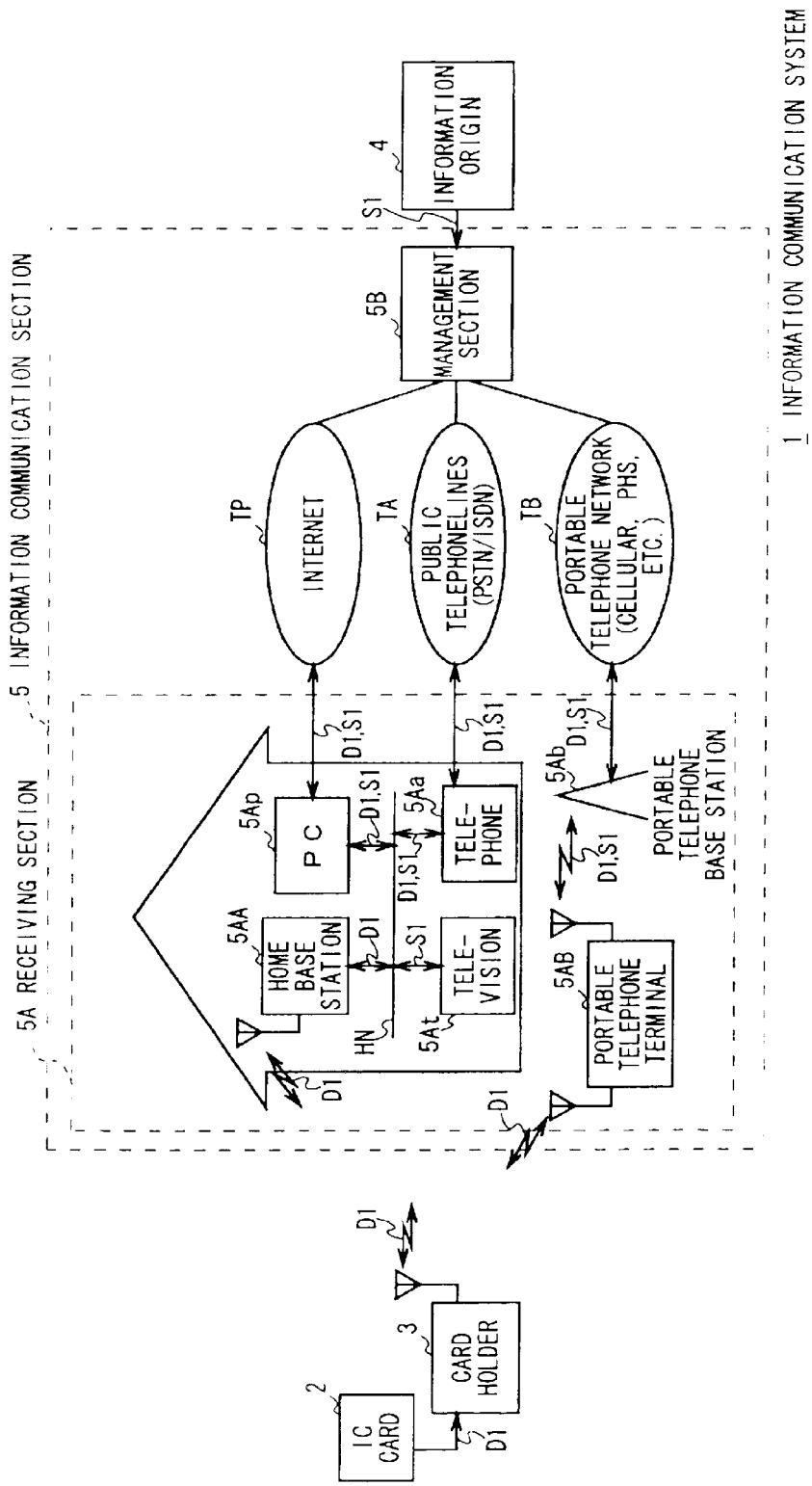
FIG. 1 is a block diagram showing a configuration of an information communication system according to the embodiment of the present invention.

One embodiment of the present invention will be hereinafter described with reference to the drawings.

(1) As to Bluetooth

A Bluetooth to be used in this embodiment will be hereinafter described first.

A Bluetooth is a short distance wireless data communication technology replacing a cable and an IrDA Infrared Data Association) that is an infrared ray communication technology, and performs transmission and reception of data, audio information and the like in the ISM (Industrial Scientific Medical) band of 2.45 [GHz]. In addition, the Bluetooth has seven slaves for one master, in which the communication rate is 721 [Kbps] and an output is in the rage from 0 dBm to 20 dBm, and which are low power consuming. In addition, it uses high frequency, among the frequency hopping spread-spectrum method for communication by always hopping (shifting positions of) frequencies in a transmitting side and a receiving side. Thus, it is characterized by unlimited directivity in transmitting and receiving data and sounds between the transmitting side and the receiving side.

(2) Configuration of an Information Communication System According to this Embodiment In FIG. 1, reference numeral 1 denotes an information communication system as a whole in this embodiment, which is composed of a non-contacting type IC card 2 storing user data D1 including a peculiar ID (individual number) and the like which is given in advance to a user (not shown), a terminal 3 for reading out the user data D1 from the IC card 2 (hereinafter referred to as a card holder 3), and an information communication section 5 for communicating various kinds of information S1 from an information origin 4, by managing an access route to the user, based on the user data D1 transmitted from the card holder 3 using a so-called Bluetooth.

The information communication section 5 composed of a receiving section 5A for receiving the user data D1 of the IC card 2 transmitted from the card holder 3, and a management section 5B for managing a best access route to the user, based on the user data D1 transferred from the receiving section 5A through various kinds of access routes.

In the receiving section 5A, there are a home base station 5AA that is mutually connected to a home telephone 5Aa, a television 5At (hereinafter referred to as a television 5At) and a personal computer 5Ap, via a home network HN under, for example, the IEEE (Institute of Electrical and Electronics Engineers) 1394, at a user's home, and a portable telephone terminal 5AB that the user owns. The home base station 5AA is mutually connected to the management section 5B by the telephone 5Aa or the personal computer 5Ap via a public telephone lines TA consisting of corresponding PSTN (Public Switched Telecommunication Network) and ISDN (Integrated Service Digital Network) and the like, or the Internet TP consisting of the public telephone lines TA and the like.

In addition, the portable telephone terminal 5AB can mutually communicate with a corresponding base station 5Ab of portable telephones, and the base station 5Ab is mutually connected to the management section 5B via a portable telephone network TB such as a cellular or a PHS (Personal Handy-phone System).

In this way, these home base station 5AA and the portable telephone terminal 5AB are respectively made to transfer the user data D1 received from the card holder 3, to the management section 5B through the corresponding public telephone lines TA, the Internet TP and the portable telephone network TB.

Then the management section 5B manages an access route by sequentially updating a best access route to a user, by mutually confirming which route the user data D1 transmitted from the receiving section 5A is transmitted through, or whether or not it is possible to access the receiving section 5A having transmitted the user data D1 at predetermined time intervals, while registering the current receipt sensitivity of the user data D1 in the receiving section 5A in a built-in second hard disk device 68 which will be described later.

In this way, the management section 5B, when given various kinds of information S1 such as an evacuation order, disaster information and the like from the information origin 4, selects a best access route among access routes to the user, and communicates the various kinds of information S1 to the user using the access route.

That is, the management section 5B communicates the various kinds of information S1 given from the information origin 4, to the telephone 5Aa via the public telephone lines TA and to the television 5At, which is connected to the telephone 5Aa via the home network HN, if the public telephone line TA is selected as an access route to the user, and on the other hand, communicates the various kinds of information S1 to the personal computer 5Ap via the Internet Tp if the Internet Tp is selected as the access route, and also communicates the various kinds of information S1 via the portable telephone network TB to the portable telephone terminal 5AB if the portable telephone network TB is selected as the access route.

Incidentally, the management section 5B can recognize a location of a user when the public telephone lines TA can be selected as an access route, by recognizing a location of a telephone 5Aa at the user's home (i.e., a location of the user's home) to be connected via the public telephone lines TA.

With this function, the management section 5B can certainly communicate the various kinds of information S1 to specified users in the targeted area of evacuation based in the various kinds of information S1, for example.

In this way, in the information communication system 1, when given various kinds of information S1 from the information origin 4, the management section 5B can select a best access route to the user by receiving the user data D1 transmitted from the card holder 3 inserting the IC card 2 held by the user, with the receiving section 5A of the information communication section 5, and managing an access route to the user by giving the data to the management section 5B via a predetermined route, and can inform the user of the various kinds of information S1 by transmitting the various kinds of information S1 to the telephone 5Aa, television 5At, personal computer 5Ap or portable telephone terminal 5AB via the corresponding route.

Further, in this case, although the user data D1 including user IDs is stored in the non-contacting type IC card 2 and is transmitted using the Bluetooth from the card holder 3, the present invention is not limited to this, and may be configured to store the user data D1 in, for example, a contacting-type IC card and the like, or may be configured to transmit the user data D1 from the card holder 3 by using various wireless data communication technologies other than the Bluetooth.

(3) Detailed Configuration of the Card Holder

Figure 2:
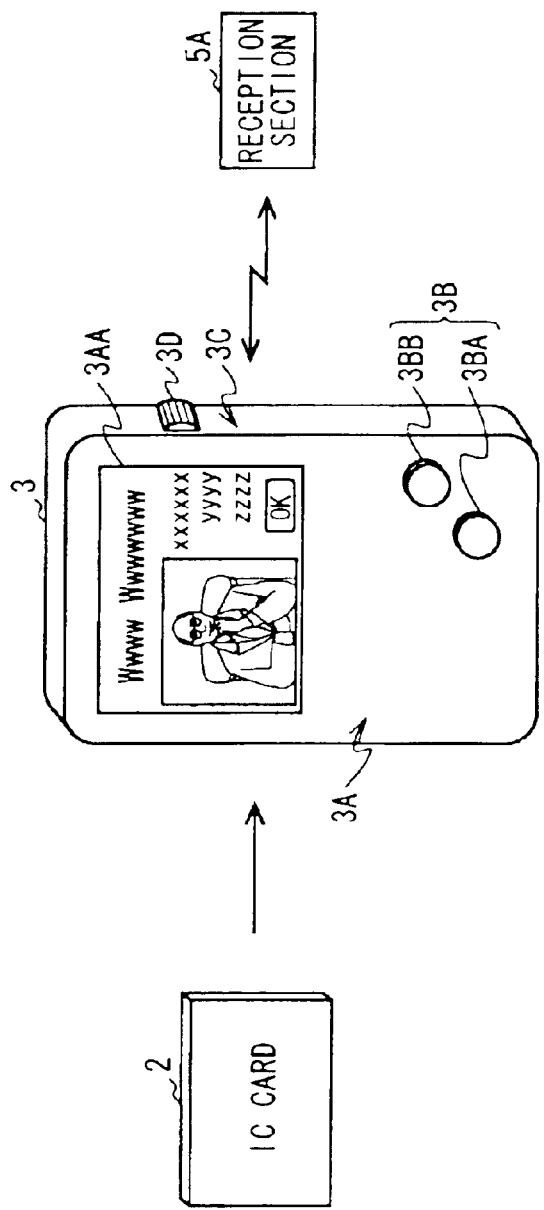
FIG. 2 is a schematic perspective view showing a configuration of a card holder.

Here, as shown in FIG. 2, the card holder 3 held by the user is configured by being provided with a display section 3AA, and a determination button 3BA and a cancellation button 3BB as an operation button 3B for performing operations in correspondence with an image displayed on the display section 3AA, on a front surface 3A, and a so-called jog dial 3D on a side 3C.

When the IC card 2 is inserted through a card inserting opening (not shown), the card holder 3 reads out the user data D1 stored in the IC card 2, and transmits the user data D1 to the receiving section 5A of the information communication section 5 using the Bluetooth (not shown).

In addition, the card holder 3 displays images based on the user data D1 and the like on the display section 3AA by storing the user data D1 read out from the IC card 2, and various kinds of data read out from other various IC cards.

Then, the card holder 3 performs, by being operated by the user using the job dial 3D, such control as to switch an image on the display section 3AA to a next image and, by being operated using the determination button 3BA and the cancellation button 3BB, controls to determine or cancel contents of the image on the display section 3AA based on the operation.

Figure 3:
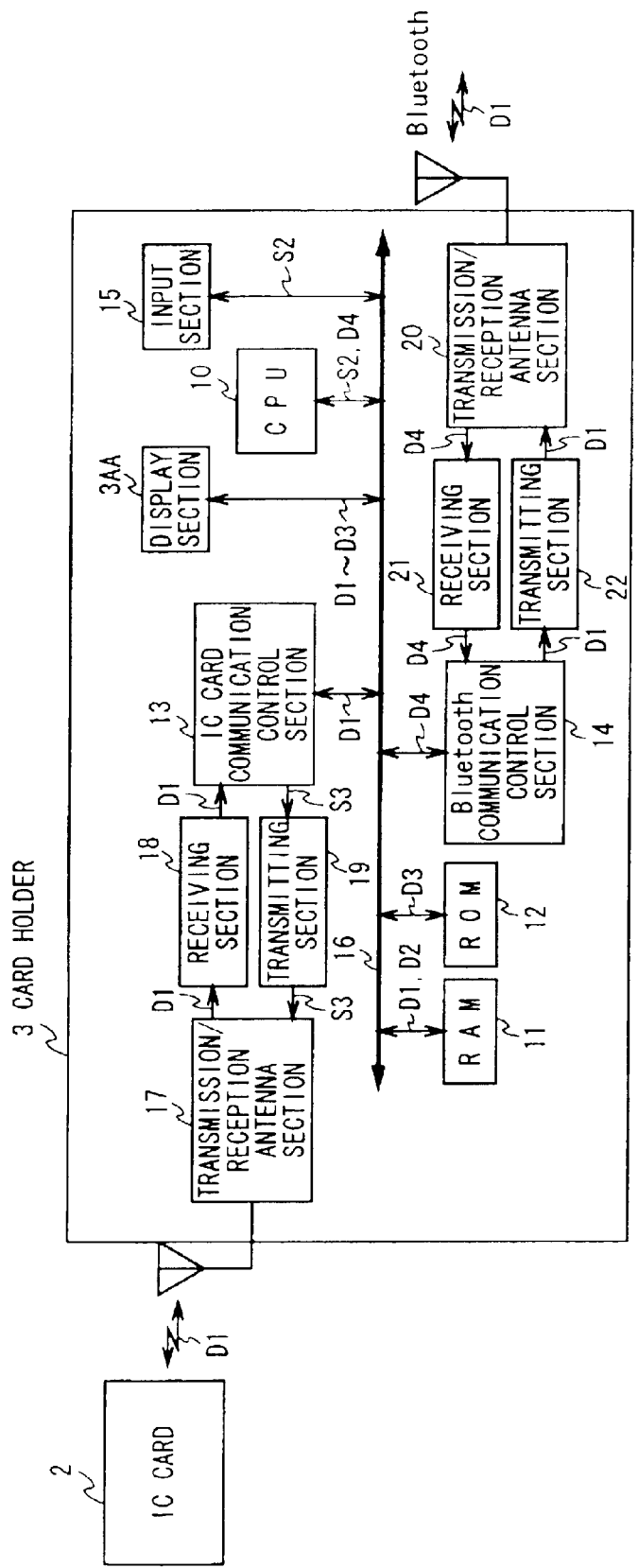
FIG. 3 is a block diagram showing the configuration of the card holder.

As shown in FIG. 3, in the card holder 3 in practice, a CPU (Central Processing Unit) 10, a RAM (Random Access Memory) 11, a ROM (Read Only Memory) 12, a first communication control section 13 for an IC card, a second communication control section 14 for the Bluetooth, the display section 3AA, and an input section 15 consisting of the operation button 3B and the job dial 3D are connected with a bus 16, and a first communication control section 13 and a transmission/reception antenna section 17 for an IC card are connected to each other with a receiving section 18 and a transmitting section 19, and a second communication control section 14 and a second transmission/reception antenna section 20 for bluetooth are connected to each other with a receiving section 21 and a transmitting section 22.

Then, when the IC card 2 is inserted through the inserting opening and an antenna (not shown) incorporated in the IC card 2 and the first transmission/reception antenna section 17 can communicate with each other, the CPU 10 gives a read-out signal 3 for reading out the stored user data D1 from the IC card 2, to the IC card 2 via the transmitting section 19 and the first transmission/reception antenna section 17, by controlling the first communication control section 13.

Incidentally, at this point, the IC card 2 supplies power simultaneously with data communication on the basis of an electromagnetic wave of the read-out signal S3 given from the card holder 3.

In this way, the first communication control section 13 reads out the user data D1 stored in the IC card 2, from the IC card 2 via the first transmission/reception antenna section 17, and gives it to the receiving section 18.

The receiving section 18, after performing predetermined inputting processing such as data demodulation on the user data D1, takes the data in the RAM 11 sequentially via the first communication control section 13 and the bus 16, for a back-up of the data.

In addition, the CPU 10 controls the second communication control section 14 to retrieve the communicatable receiving section 5A (FIG. 1) using the transmission/reception antenna section 20. Then, when detecting the communicatable receiving section 5A, the second transmission/reception antenna section 20 gives it to the CPU 10 as detection data D4 sequentially via the receiving section 21 and the second communication control section 14.

The CPU 10 reads out the user data D1 from the RAM 11 based on the detection data D4, and gives the data to the transmitting section 22 via the second communication control section 14.

The transmitting section 22, after applying predetermined output processing such as data modulation to the user data D1, transmits the data to the receiving section 5A of the communication section 5 via the second transmission/reception antenna section 20.

In addition, the CPU 10 causes the display section 3AA to display images based on the user data D1 by controlling the display section 3AA. The CPU 10, then, reads out image data D2 and D3 of images corresponding to operational command S2 given by the user with the operation button 3B and the jog dial 3D in this state, from the corresponding RAM 11 or the ROM 12, and causes the display section 3AA to display the images based on the image data D2 and D3 through the bus 16.

In this way, in this card holder 3, the user data D1 is read out from the inserted IC card 2 and is selectively transmitted to the communicatable receiving section 5A of the information communication section 5.

(4) Detailed Configuration of the Home Base Station

Figure 4:
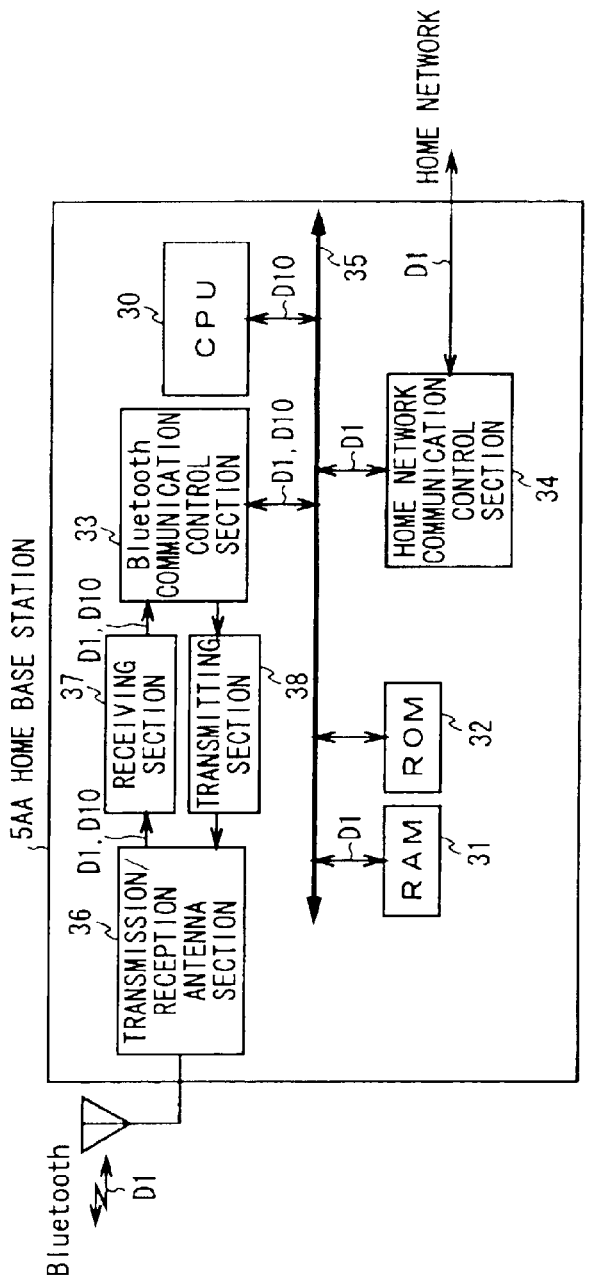
FIG. 4 is a block diagram showing a configuration of a home base station.

As shown in FIG. 4, in the home base station 5AA, a CPU 30, an RAM 31, an ROM 32, a first communication control section 33 for the Bluetooth, and a second communication control section 34 for the home network HN under the IEEE1394 are mutually connected with a bus 35, and a first communication control section 33 and a transmission/reception antenna section 36 are connected with a receiving section 37 and a transmitting section 38.

The CPU 30 causes the transmission/reception antenna section 36 to retrieve the communicatable card holder 3

(FIGS. 1 and 3) by controlling the first communication control section 33. Then, when detecting the communicatable card holder 3, the transmission/reception antenna section 36 gives it to the CPU 30 as detection data D10 sequentially via the receiving section 37 and the first communication control section 33.

The CPU 30 controls the first communication control section 33 based on the detection data D10, and receives the user data D1 transmitted from the card holder 3, via the transmission/reception antenna section 36 and takes the data in the receiving section 37.

The receiving section 37, after applying predetermined input processing including data demodulation to the user data D1, gives the data to the first communication control section 33. The first communication control section 33 gives the user data D1 given by the receiving section 37, to the RAM 31 and the second communication control section 34 through the bus 35 under the control of the CPU 30.

Then, the RAM 31 takes in the given user data D1 for a back-up of the data. In addition, the second communication control section 34 transfers the user data D1 given by the first communication control section 33 through the bus 35, to the telephone 5Aa, the personal computer 5Ap (FIG. 1) and the like via the home network HN, under the control of the CPU 30.

Thereafter, the telephone 5Aa and the personal computer 5Ap forwards the user data D1 transferred from the home base station 5AA via the home network HN, to the management section 5B via the public telephone lines TA or the Internet TP.

In this way, in the home base station 5AA, the user data D1 can be forwarded to the management section 5B via the corresponding public telephone lines TA or the Internet TP by receiving the user data D1 transmitted from the card holder 3 and transferring the data to the telephone 5Aa and the personal computer 5Ap connected with the home network HN, and when the various kinds of information S1 is supplied from the information origin 4 to the management section 5B by these operations, the data are communicated to the telephone 5Aa or the personal computer 5Ap via the corresponding public telephone lines TA or the Internet TP.

(5) Detailed Configuration of the Portable Telephone Terminal

Figure 5:
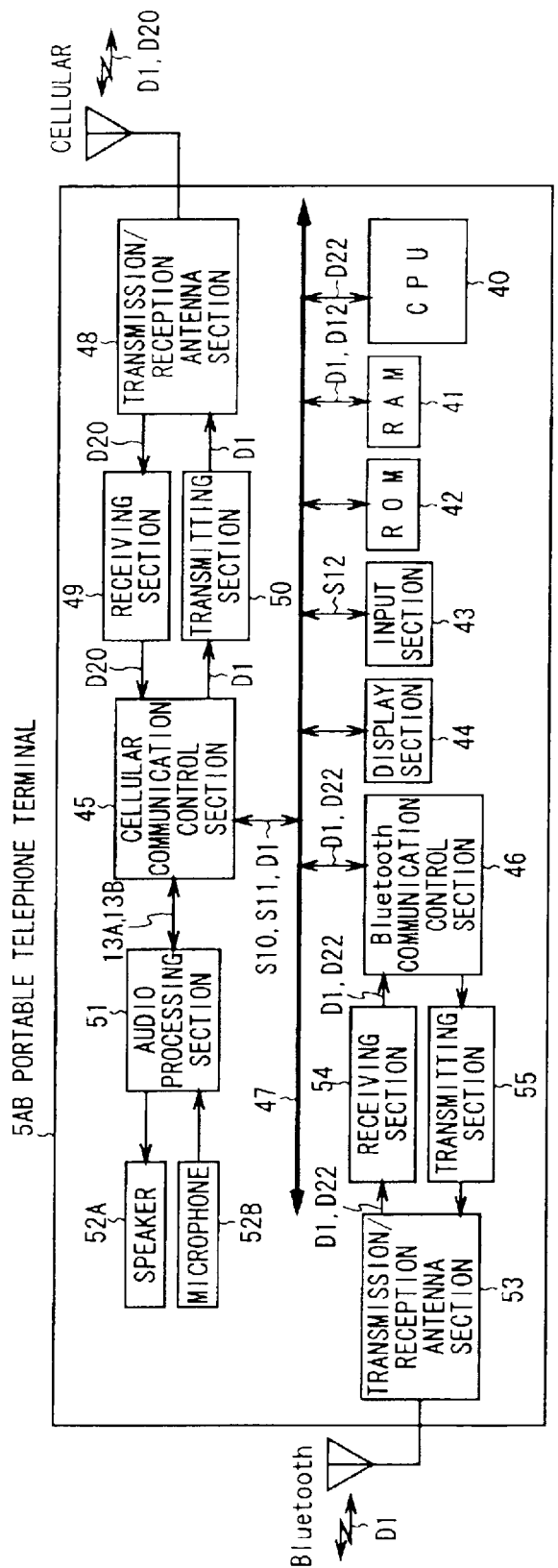
FIG. 5 is a block diagram showing a configuration of a portable telephone terminal.

As shown in FIG. 5, in the portable telephone terminal 5AB, a CPU 40, an RAM 41, an ROM 42, an input section 43 consisting of operation buttons for operating outgoing and incoming calls, terminating calls, inputting numbers, selection of various kinds of functions and the like (not shown), a display section 44, a first communication control section 45 for a cellular, and a communication control section 46 for the Bluetooth are mutually connected with a bus 47, and the first communication control section 45 and a first transmission/reception antenna section 48 for the cellular are connected with a receiving section 49 and a transmitting section 50, and the first communication control section 45 is connected to a speaker 52A and a microphone 52B with an audio processing section 51.

In addition, the second communication control section 46 and a second transmission/reception antenna section 53 for the Bluetooth are connected with a receiving section 54 and a transmitting section 55.

The CPU 40 causes the first transmission/reception antenna section 48 to retrieve the communicatable base station 5Ab (FIG. 1) by controlling the first communication control section 45. Then, the first transmission/reception antenna section 48 retrieves the communicatable base station 5Ab and gives a retrieval result to the first communication control section 45 via the receiving section 49 as retrieval data D20.

Then, if the retrieval result based on the retrieval data D20 is positive, the first communication control section 45 forwards an in-range signal S10 representing that the base station is within the communication range, to the CPU 40. In addition, if the retrieval result is negative, the first communication control section 45 forwards an out-of-range signal S11 representing the base station is outside the communication range, to the CPU 40.

In this way, the CPU 40 can manage communication state by controlling the first communication control section 45.

In addition, the CPU 40, when given an operation command S12 for operating communication, selection of various kinds of functions and the like, from the user with the input section 43, retrieves an operation program corresponding to the operation command S12 out of various kinds of applications stored in the ROM 42 and, after reading out the program to the RAM 41, causes the display section 44 to display an image based on the operation program.

Then, if an operation from the user that is given based on the image on the display section 44 is a request for a call, data communication and the like, the CPU 40 controls the first communication control section 45 in response to the request, and accesses a telephone (not shown) of the other party that the user desires, sequentially via the first transmission/reception antenna section 48, the base station 5Ab and the portable telephone network TB.

In this way, for example, when the user's voice is taken in an audio processing section 51 via a microphone 52B while the CPU 40 is accessing the other party's telephone, the first communication control section 45 inputs voices which has been subjected to audio processing by the audio processing section 51, as an audio signal S13A in an audio processing section 51, and gives the signal to the transmitting section 50. Then, the transmitting section 50, after applying predetermined output processing such as modulation processing to the given audio signal S13A, transmits the signal to the other party's telephone that the user desires, sequentially via the first transmission/reception antenna section 48, the base station 5Ab and the portable telephone network TB, under the control of the first communication control section 45.

On the other hand, the portable telephone terminal 5AB, when the audio signal S13B is given from the other party's telephone sequentially via the portable telephone network TB and the base station 5Ab, receives the signal by the first transmission/reception antenna section 48 and, after applying predetermined input processing such as demodulation processing to the signal via the receiving section 49, takes it in the first communication control section 45.

After forwarding the audio signal S13B to the audio processing section 51 and applying certain audio processing to it, the first communication control section 45 outputs the signal via a speaker 52A as voices.

In addition, when characters, symbols and the like are inputted from the user via the input section 43, and an operation command S12 is inputted for requesting data communication of messages including the characters and the like while the CPU 40 is accessing the other party's telephone, the CPU 40 takes the inputted characters, symbols and the like in the RAM 41 as character data D21 for a back-up of data.

Then, the CPU 40 forwards the character data D21 to the transmitting section 50 via the first communication control section 45 by controlling the first communication control section 45. The transmitting section 50, after applying predetermined output processing to the given character data D21, transmits the data to the other party's telephone sequentially via the first transmission/reception antenna section 48, the base station 5Ab and the portable telephone network TB.

In this way, the portable telephone terminal SAB can access a designated other party and respond to a request of a call, data communication and the like according to an operation of the user.

On the other hand, the CPU 40 causes the second transmission/reception antenna section 53 to retrieve the communicatable card holder 3 (FIGS. 1 and 3) by controlling the second communication control section 46. Then, when retrieving the communicatable card holder 3, the second transmission/reception antenna section 53 gives it to the CPU 40 as detection data D22 sequentially via the receiving section 54 and the second communication control section 46.

The CPU 40 controls the second communication control section 46 based on the detection data D22, and receives the user data D1 transmitted from the card holder 3 by the second transmission/reception antenna section 53 and takes the data in the receiving section 54.

After applying predetermined input processing including data modulation and the like to the user data D1, the receiving section 54 give the data to the second communication control section 46. The second communication control section 46 gives the user data D1 given from the receiving section 54, to the RAM 41 and the first communication control section 45 through the bus 47.

Then the RAM 41 takes in the given user data D1 for a back-up of the data. In addition, the first communication control section 45 forwards the user data D1 given from the second communication control section 46 through the bus 47, to the management section 5B via the first communication control section 48, a base station 5Ab and the portable telephone network TB, under the control of the CPU 40.

In this way, the portable telephone terminal 5A3 can receive the user data D1 transmitted from the card holder 3 and forward the data to the management section 5B via the portable telephone network TB and, when the various kinds of information S1 is supplied to the management section 5B from the information origin 4 by these operations, the information is communicated to the portable telephone terminal 5AB via the corresponding portable telephone network TB.

(6) Detailed Configuration of the Management Section

Figure 6:
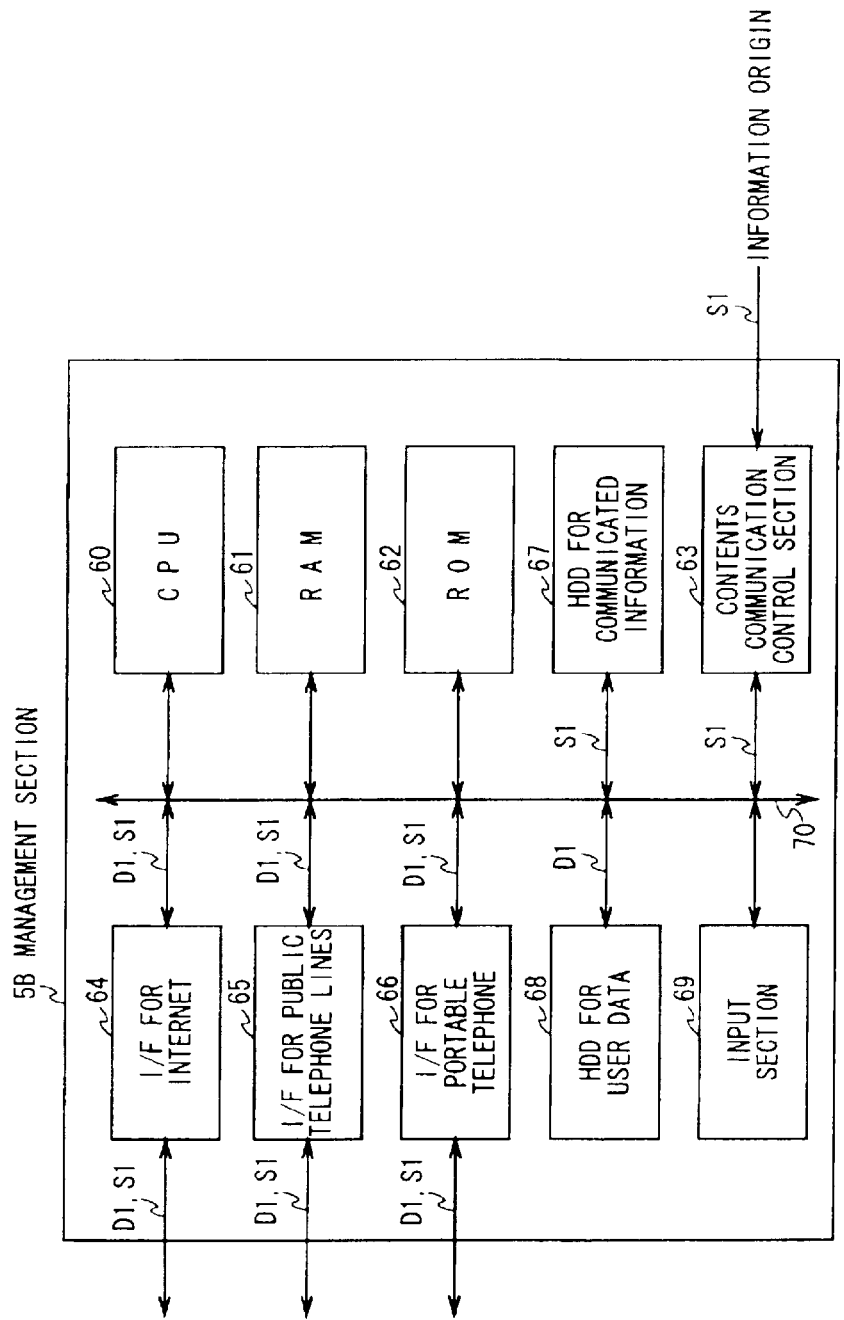
FIG. 6 is a block diagram showing a configuration of a management section.

As shown in FIG. 6, in the management section 5B, a CPU 60, a RAM 61, a ROM 62, a communication control section 63 for an information origin 4, a first interface circuit 64 for the Internet TP, a second interface circuit 65 for the public telephone lines TA, a third interface circuit 66 for the portable telephone network TB, a first hard disk device 67 for managing various kinds of information (contents) S1 supplied from the information origin 4, a second hard disk device 68 for managing the user data D1, and an input section 69 consisting of a keyboard, a mouse and the like are mutually connected with a bus 70 and also, the first to the third interface circuits 64 to 66 are mutually connected with the corresponding Internet TP, public telephone lines TA and portable telephone network TB respectively.

When a predetermined operation program is selected out of various kinds of application programs stored in the ROM 62 via the input section 69 by an operator (not shown), the CPU 60 reads out the program in the RAM 61 and executes it.

Then, the CPU 60 takes the user data D1 of the card holder 3 transferred from the telephone 5Aa of the receiving section 5A, the base station 5Ab of the portable telephone, and the personal computer 5Ap through respectivly corresponding public telephone lines AT, portable telephone network TB and the Internet TP, in the second hard disk device 68 sequentially via the corresponding second interface circuit 65, third interface circuit 66 and first interface circuit 64 and the bus 70.

In the second hard disk device 68, an ID based on the user data D1 shown in FIG. 7, routes and the number of routes through which the user data D1 is transferred, means (access type) for communicating information to the user, a level of receipt sensitivity (a communication state with the card holder 3) of the user data D1 in the receiving section 5A, a calling method in accessing the user, a location (position) of the user and so on are registered as databases.

Then the CPU 60 manages an access route to the user who transferred the user data D1, based on the database of the second hard disk device 68 and, at the same time, by updating the database of the user data D1 only if there is a change in the access route by mutually confirming with the receiving section 5A about the communication state of the receiving section 5A and the card holder 3 at predetermined time intervals set in advance, can always select a best access route to the user.

In addition, the CPU 60 takes the various kinds of information S1 to be supplied from the information origin 4, in the first hard disk device 67 sequentially via the communication control section 63 and the bus 70. In the first hard disk device 67, contents of the various kinds of information S1 supplied from the information origin 4 and a user's ID to be designated by the information origin 4 as a destination of communication are registered as a database of communication information, based on the information.

Then, the CPU 60 compares the user ID, designated by the information origin 4, registered in the first and the second hard disk devices 67 and 68 with the user ID based on the user data D1 by controlling the first and the second hard disk devices 67 and 68.

As a result, only when these IDs coincide, the CPU 60 reads out the information based on the various kinds of information S1 given from the information origin 4, from the database of the first hard disk device 67, forwards the information to the receiving section 5A sequentially via the bus 70, the first, the second or the third interface circuit 64, 65 and 66, and corresponding public telephone lines TA, portable telephone network TB or the Internet TP, and communicate the information to a targeted user of transmission.

In addition, the CPU 60 can save the time until the information is communicated to the user, by supplying in advance predetermined information supplied from the information origin 4 corresponding to a user having an ID designated by the information origin 4, to the telephone 5Aa, the base station of the portable telephone terminal 5AB and the like in the designated receiving section 5A.

In this way, in the management section 5B, the CPU 60 manages the access route to the user by controlling the second hard disk device 68, a user in the evacuation area is designated based on the various kinds of information S1 such as an evacuation order and a disaster information supplied from the information origin 4, by controlling the communication control section 63, and a best access route to the user is selected to certainly communicate the information to the user.

(7) Communication Processing Procedures Between the Card Holder and the Information Communication Section (7-1) First Communication Processing Procedure in the Card Holder Here, in such an information communication system 1, in the card holder 3, when the IC card 2 is inserted through the card inserting opening while power is on, the CPU 10 of the card holder 3 executes a first communication processing procedure RT1 shown in FIG. 7 and reads out the user data D1 of the IC card 2, which is transmitted (notice) to the communicatable home base station 5AA and the portable telephone terminal 5AB in the receiving section 5A.

That is, the CPU 10 starts the first communication processing procedure RT1 in step SP0 when the IC card 2 is inserted through the card inserting opening while power is on, and the processing moves to next step SP1.

In step SP1, the CPU 10 controls the first communication control section 13 and causes it to read out the user data D1 stored in the inserted IC card 2 to take the user data D1 in the RAM 11 for a back-up of the data and, in next step SP2, causes the first transmission/reception antenna section 17 to retrieve the communicatable receiving section 5A under the control of the first communication control section 13.

Thereafter, the CPU 10 advances the processing to next step SP3, and prepares a list of communicatable destinations (the home base station 5AA and the portable telephone terminal 5AB, etc.) (hereinafter referred to as a destination list) based on the retrieval result by the first transmission/reception antenna section 17, and then advances the processing to next step SP4.

The CPU 10 transmits the user data D1 to all the destinations in the communicatable receiving section 5A based on the destination list in step SP4. Then, the CPU 10 advances the processing to next step SP5, in which waits for a fixed time set in advance, and then determines whether or not to complete the first communication processing procedure RT1 in step SP6.

Then, when obtaining a positive result with the user giving an operation to complete the first communication processing procedure RT1 via the input section 15 in step SP6, the CPU 10 advances the processing to next step SP7 to complete the first communication processing procedure RT1. On the other hand, when obtaining a negative result in step SP6, the CPU 10 advances the processing to step SP8.

In step SP8, the CPU 10 causes the first transmission/reception antenna section 17 to retrieve the communicatable receiving section 5A again under the control of the first communication control section 13, and advances the processing to next step SP9.

In step SP9, the CPU 10 prepares a list of communicatable destinations again based on the retrieval result by the first transmission/reception antenna section 17, and advances the processing to next step SP10 and compares the destination list with the destination list prepared in step SP3 to determine whether or not there is any change.

Then, when obtaining a negative result meaning that there is no change in the destination list in step SP 10, the CPU 10 advances the processing to next step SP11, where the CPU 10 transmits the user data D1 again to all the destinations in the communicatable receiving section 5A based on the destination list, and returns the processing to step SP5.

On the other hand, when obtaining a positive result meaning that there is a change in the destination list in step SP10, the CPU 10 advances the processing to step SP12, where the CPU 10 updates the destination list based on the retrieval result by the first transmission/reception antenna section 17 in step SP8.

Thereafter, the CPU 10 advances the processing to step SP11 and transmits the user data D1 to all the destinations in the communicatable receiving section 5A based on the updated destination list, and then returns the processing to step SP5.

The CPU 10 waits for a fixed time in step SP5 again and advances the processing to step SP6, and thereafter repeats the loop of step SP5-SP6-SP8 through SP11-SP5 or step SP5-SP6-SP8 through SP10-SP12-SP11-SP5 until a positive result meaning that the first communication processing procedure is completed in step SP6.

In this way, in the card holder 3, by continuing to transmit the user data D1 (that is, continuing to access the destination of the user data D1) every a predetermined time to the communicatable receiving section 5A in the first communication processing procedure RT1, the management section 5B can recognize that access can be made through the access route via the destination of the user data D1 (the home base station 5AA and the portable telephone terminal 5AB).

Figure 8:
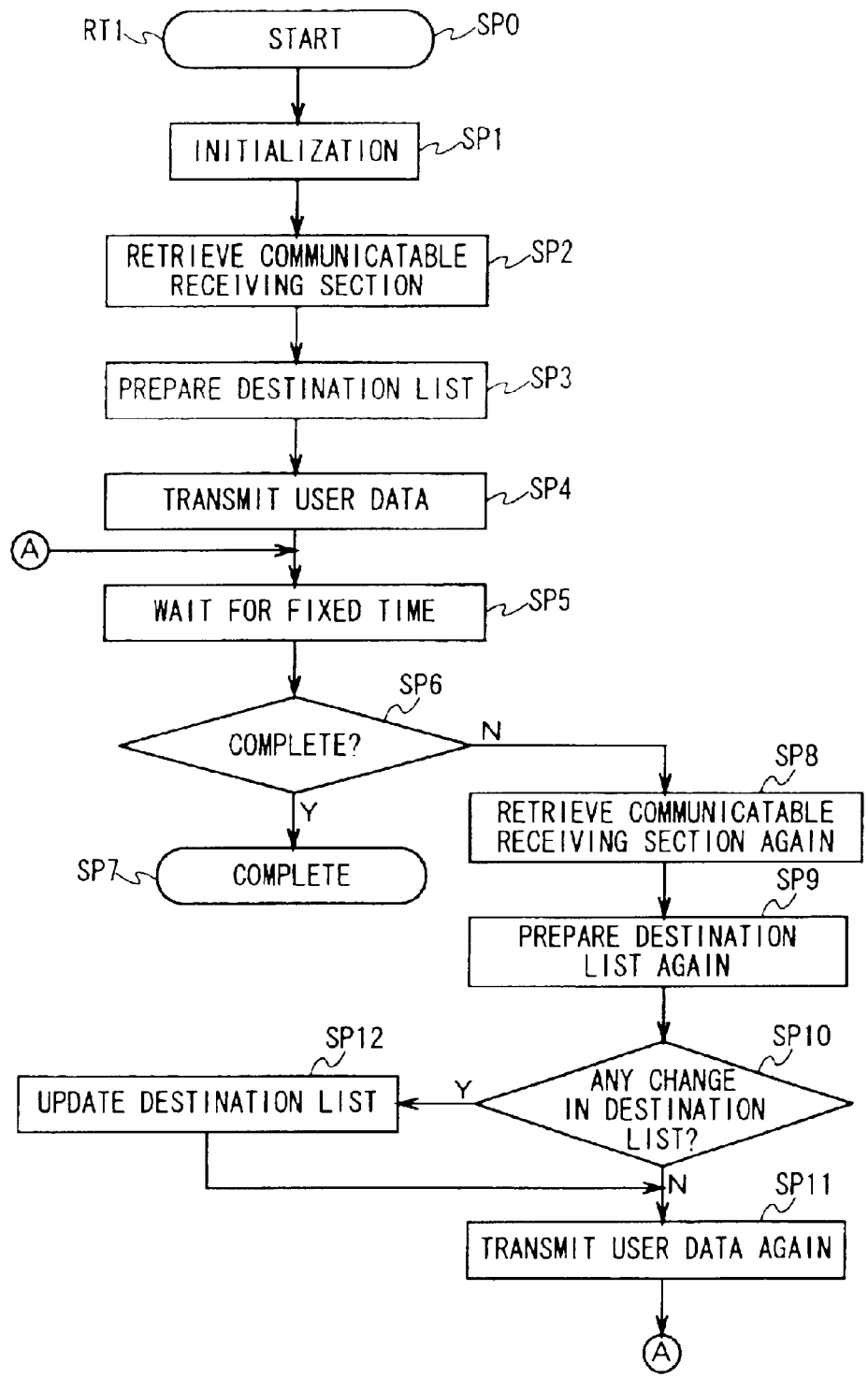
FIG. 8 is a flow chart showing a first communication processing procedure.

(7-2) Second Processing Procedure in the Home Base Station and the Portable Telephone Terminal In addition, in the information communication system 1, in the home base station 5AA and the portable telephone terminal 5AB in the receiving section 5A of the information communication section 5, when power is turned on respectively, the CPU 30 of the home base station 5AA and the CPU 40 of the portable telephone terminal 5AB execute a second communication processing procedure RT2 shown in FIG. 8, and receive the user data D1 transmitted from the card holder 3 to transmit the data to the management section 5B.

That is, the CPUs 30 and 40 start the second communication processing procedure RT2 in step SP20 when power is turned on, and advance the processing to next step SP21 and control the first communication control section 33 and second communication control section 46 respectively.

Then, the CPUs 30 and 40, in step SP 21, under the control of the first communication control section 33 and the second communication section 46, wait until receiving the user data D1 of the communicatable card holder 3 that the corresponding transmission/reception antenna section 36 and second transmission/reception antenna section 53 retrieved (until receiving a notice from the card holder 3), and when receiving the user data D1, advance the processing to next step SP22, and transfer the user data D1 to the management section 5B.

At this point, the CPUs 30 and 40, if they have received the information given by the information origin 4 for the user having the predetermined ID in advance, from the management section 5B, advance the processing to step SP23, compare the user ID based on the user data D1 notified of by the card holder 3 with the user ID designated by the information origin 4 and, only when these user IDs coincide, communicate the information given from the information origin 4, to a targeted user, and advance the processing to next step SP24.

In addition, the CPUs 30 and 40, if they have not received the above-mentioned predetermined information from the management section 5B after transferring the user data D1 to management section 5B in step SP22, advance the processing to step SP24 directly.

Then, the CPUs 30 and 40 determine whether or not to complete the second communication processing procedure RT2 in step SP24 and, if a positive result is obtained, advance the processing to step SP25 and complete the second communication processing procedure RT2.

On the other hand, when obtaining a negative result in step SP24, the CPUs 30 and 40 return the processing to step SP21, control the first communication control section 33 and the second communication section 46 again, and wait until receiving a notice from the communicatable card holder 3 retrieved by the corresponding transmission/reception antenna section 36 and second transmission/reception antenna section 53, and thereafter repeat steps SP21 through SP24 until a positive result is obtained in step SP24.

Figure 9:
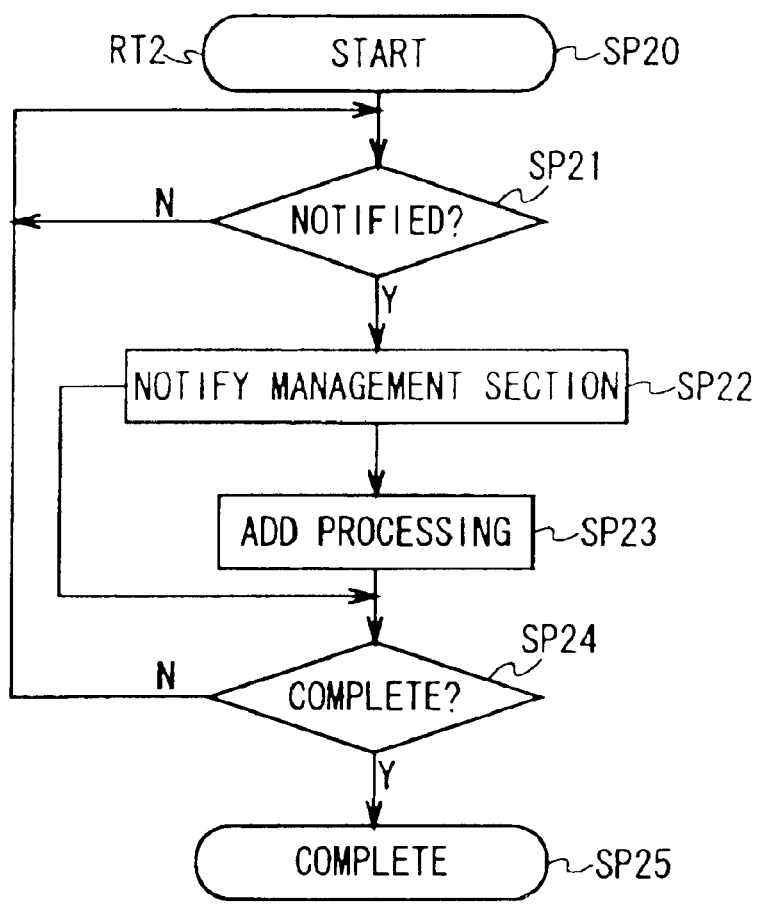
FIG. 9 is a flow chart showing a second communication processing procedure.

(7-3) User List Update Processing Procedure in the home base Station and the Portable Telephone Terminal On the other hand, the CPU 30 of the home base station 5AA and the CPU 40 of the portable telephone terminal 5AB execute the above-mentioned second communication processing procedure RT2 and, at the same time, execute a communication confirmation processing procedure RT3 shown in FIG. 9 and, based on the user data D1 notified of, confirm with a card holder 3 that does not notify of the user data D1 again after the predetermined time set in advance elapses, among the notified card holders 3, if it is an accessible card holder 3.

That is, the CPUs 30 and 40, when obtaining a positive result meaning that the user data D1 is notified of in step SP21 of the second communication processing procedure RT2, start the communication confirmation processing procedure RT3 in step SP30 and advance the processing to next step SP31, and prepare a list of the card holders 3 which notified of the user data D1 (hereinafter referred to as a card holder list), based on the user data D1 notified of, to register the card holder 3.

Thereafter, the CPUs 30 and 40 advance the processing to step SP32, wait until a predetermined time elapses and, after the predetermined time elapsed, advance the processing to step SP33 and determine whether or not they are notified again from the card holder 3 registered in the card holder list.

The CPUs 30 and 40, when obtaining a positive result meaning that a notice is received again from the card holder 3 registered in the card holder list in step SP33, return the processing to step SP32, and wait for the predetermined time again.

On the other hand, the CPUs 30 and 40, when obtaining a negative result meaning that a notice is not received again from the card holder 3 registered in the card holder list in step SP33, advance the processing to step SP34, select card holders 3 from which no notice was obtained (that notified of nothing), from the card holder list, and advance the processing to step SP35.

In step SP35, the CPUs 30 and 40 determine whether or not the selected card holders 3 are communicatable by accessing the card holders 3 and, as a result, if a positive result is obtained meaning that access is possible, return the processing to step SP32 and wait for a predetermined time again.

On the other hand, the CPUs 30 and 40, when obtaining a negative result meaning that access to the card holders 3 selected in step SP35 is difficult, advance the processing to step 36, and update the card holder list so as to delete the card holders 3 that are difficult to access, from the card holder list.

Thereafter, the CPUs 30 and 40 advance the processing to step SP37, determine whether or not to complete the communication confirmation processing procedure RT3 and, when a negative result is obtained, return the processing to step SP32 and wait for the predetermined time again.

On the other hand, the CPUs 30 and 40, when obtaining a positive result in step SP37, advance the processing to step SP38, and complete the communication confirmation processing procedure RT3.

(7-4) Third Communication Processing Procedure in the Management Section 5B of the Information Communication Section 5.

Figure 10:
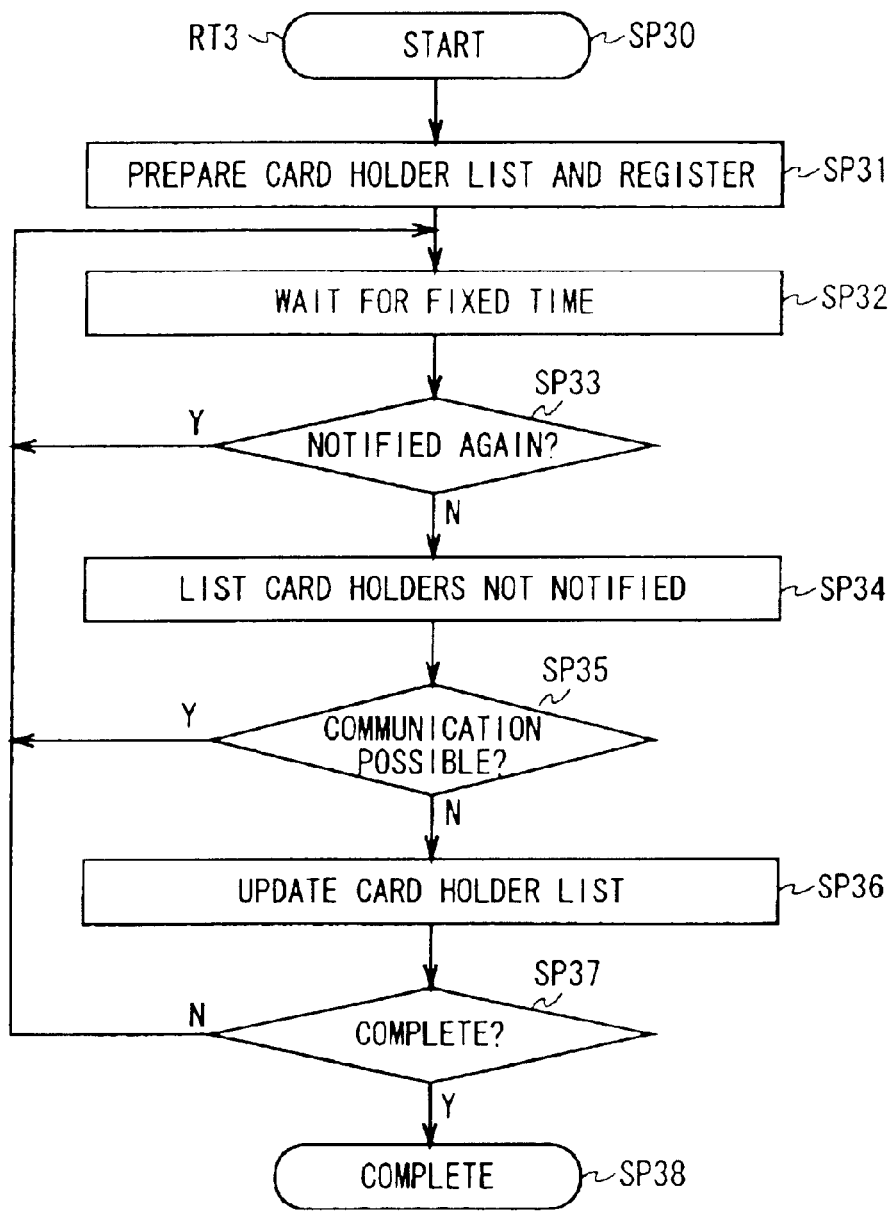
FIG. 10 is a flow chart showing a communication confirmation processing procedure.
Figure 11:
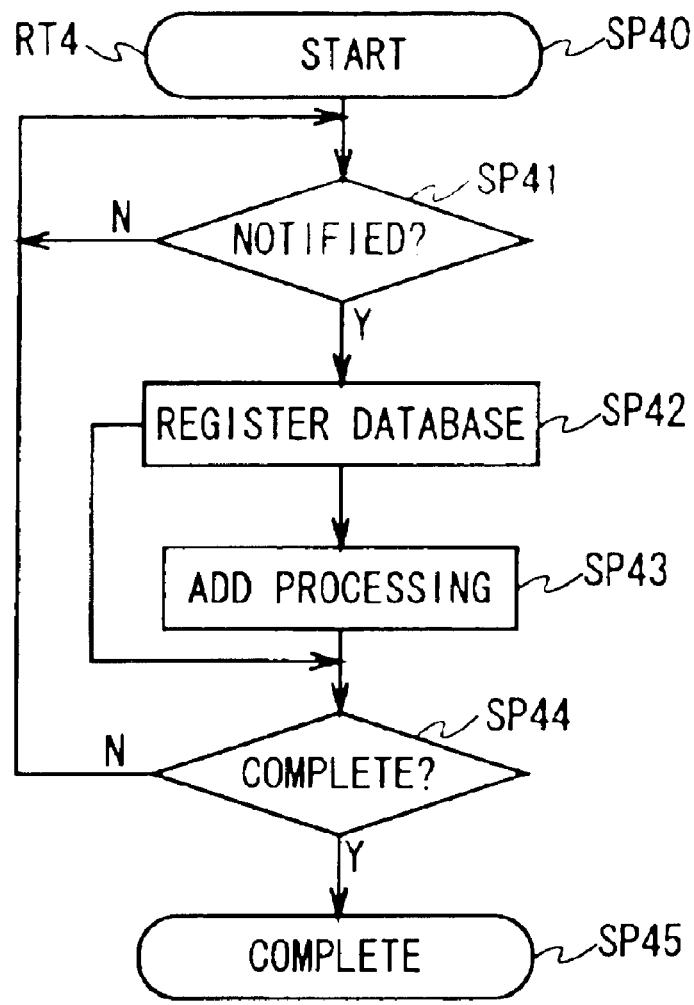
FIG. 11 is a flow chart showing a database registration processing procedure.

In addition, in the information communication system 1, in the management section 5B of the information communication section 5, when the CPU 60 of the management section 5B reads out the operation program stored in the ROM 62 to the RAM 61 while power is on, the CPU 60 executes a data base registration processing procedure RT4 shown in FIG. 10, prepares a database based on the user data D1 transferred from the home base station 5AA of the receiving section 5A and the portable telephone terminal 5AB, and manages the access route to the user.

That is, the CPU 60, when reading out the operation program stored in the ROM 62 to the RAM 61 while power is on, starts a data base registration processing procedure RT4 in step SP40, advances the processing to next step SP41, and determines whether or not the user data D1 have been transferred (notified of) from the receiving section 5A.

Then, the CPU 60 waits until the user data D1 is transferred from the receiving section 5A in step SP41 and, when obtaining a positive result as the user data D1 is transferred from the receiving section 5A, advances the processing to next step SP42, prepares a database by controlling the second hard disk device 68, and registers the access route to the user and the like based on the user data D1.

At this point, if the information given by the information origin 4 to the user having the predetermined ID in advance is registered in the database of the first hard disk device 67, the CPU 60 advances the processing to step SP43, compares the user ID based on the user Data D1 notified of from the receiving section 5A with the user ID designated by the information origin 4 and, only when the user IDs coincide, communicates the information given by the information origin 4, to a targeted user, and advances the processing to next step SP44.

In addition, after registering the access route to the user and the like based on the user data D1, to the data base, in step SP42, if the above-mentioned predetermined information is not received from the information origin 4, the CPU 60 advances the processing to step SP44 directly.

Then, the CPU 60 determines whether or not to complete the data base registration processing procedures RT4 in step SP44 and, when obtaining a negative result meaning that the data base registration processing procedure RT4 is not completed, returns the processing to the step SP41, and waits until the user data D1 is notified of by the receiving section 5A again.

On the other hand, when obtaining a positive result meaning that the data base registration processing procedure RT4 is completed in step SP44, the CPU 60 advances the processing to step SP45, and completes the database registration processing procedure RT4.

Figure 12:
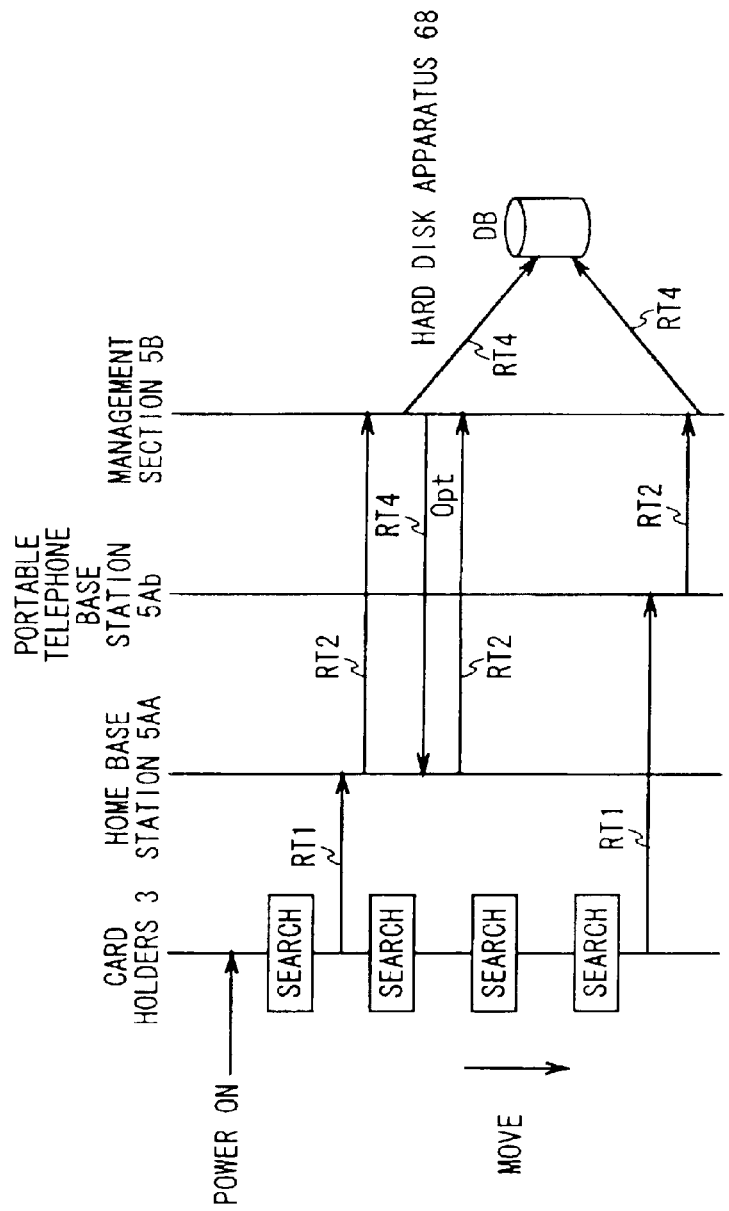
FIG. 12 is an arrow chart showing a situation of communication processing in an information communication system.

In this way, in the information communication system 1, as shown in FIG. 12, by executing the first and the second communication processing procedures RT1 and RT2 as well as the database registration processing procedure RT4 between the card holder 3, the home base station 5AA and the portable telephone terminal 5AB and the management section 5B, the user data D1 transmitted by the card holder 3 are received by the communicatable home base station 5AA and portable telephone terminal 5AB, and is transferred to the management section 5B, thereby making it possible for the management section 5B to manage the access route to the user by the database based on the user data D1.

(8) Operation and Effect of this Embodiment

In the foregoing configuration, in the information communication system 1, when the user transmits the user data D1 of the IC card 2 using the card holder 3 to the communicatable home base station 5AA and/or portable telephone terminal 5AB in the receiving section 5A, the home base station 5AA and/or the portable telephone terminal 5AB transfer(s) the received user data D1 to the management section 5B through the corresponding public telephone line TA, Internet TP and portable telephone network TB, to make a notice of the possible communication.

Then the management section 5B stores the user ID based on the transferred user data D1 and the route (that is, access route to the user) through which the user data D1 is transferred, in connection with each other.

Therefore, in the information communication system 1, the management section 5B can access the user having the ID through the access route corresponding to the designated ID.

Further, in the information communication system 1, the management section 5B confirms the connection state between the receiving section 5A and the card holder 3 at determined time intervals, and updates the access route to the user.

In this way, the management section 5B can always manage the certain access route to the user by management.

Further, in the information communication system 1, when there is a plurality of access routes corresponding to the designated ID, access can be made at the same time to the user having the ID through all access routes. In this case, for example, the communication information through the public telephone lines can be given an one access route, family information through the public telephone fines can be given to one access route, and E-mail information on Internet can be given to one access route.

Further, in the case where there is a plurality of access routes corresponding to the designated ID as described above, in the information communication system 1, a user can set a order of the access routs to communicate information in advance, the higher-ranked access route can be priority selected to communicate Information.

Further, in the information communication system 1, for example, when a plurality of users inform the management section 5B using the telephones 5Aa in the receiving sections 5, each user can wait for the information communication using the telephones 5Aa at the same time.

Further, in the information communication system 1, the home base station 5AA and the portable telephone terminal 5AB in the receiving section 5A can limit the registration of users so as not to receive the user data D1 other than the previously set IDs.

Further, in the information communication system 1, the management section 5B can limit the registration of users so as not to receive the user data D1 other than the previously set IDs.

Further, in the information communication system 1, the home base station 5AA and the portable telephone terminal 5AB in the receiving section 5A can receive the user data D1 after a pass word previously set by a user is inputted.

Further, in the information communication system 1, a pass word is set in the IC card 2, and only when the pass word is confirmed, the card holder 3 can read out the user data D1 of the IC card 2.

In the aforementioned configuration, the receiving section 5A informs the management section 5B of the individual identification information read out from the IC card by the terminal, through a communication line, and the management section 5B manages the receiving section 5A which is accessible to the user and the individual identification information of the user in connection with each other. Thereby, the management section 5B can certainly access the user via the accessible receiving section 5A corresponding to the designated individual identification information. Thus, the information communication system 1 which can remarkably improve the reliability of information communication can be realized.

Further, in the information communication system 1, the user transmits the user data D1 of the IC card 2 to the communicatable home base station 5AA and portable telephone terminal 5AB in the receiving section 5A, using the card holder 3, and notifies that the user is in a communicatable state.

Then, the home base station 5AA and the portable telephone terminal 5AB having received the notice from the user transfer the transmitted user data D1 to the management section 5B via the corresponding public telephone lines TA and portable telephone network TB and the Internet TP, and let it recognize to be communicatable with the user.

When the user data D1 is transferred, the management section 5B registers the user data D1, the transfer route, communication state and the like to the database of the user data D1, manages the access route to the user, at the same time, compares the ID of the user data D1 with the ID of the targeted user of transmission of information designated by the information origin 4 and, if the IDs coincide as a result, communicates the information to the targeted user of the transmission.

At this point, the management section 5B, if notified from the user via the public telephone lines TA, can recognize the position of the user at this point by confirming the location of the telephone 5Aa from the telephone number and the like of the telephone 5Aa connected to the public telephone lines TA, and if notified from the user via the portable telephone network TB, can recognize the position of the user having the portable telephone terminal 5AB that is communicatable with the base station 5Ab by confirming the location of the base station 5Ab for the portable telephones connected to the portable telephone network TB.

Then, such positional information of the user is also registered in the database of the user data D1 of the management section 5B.

Therefore, in the information communication system 1, a user in the targeted position of communication of information to be supplied from the information origin 4 can be selected based on the database of the user data D1 of the management section 5B, which enables certain transmission of the information to specific users only.

In addition, in this information communication system 1, after notifying the receiving section 5A of the user data D1, the card holder 3 notifies the receiving section 5A of the user data D1 again at predetermined time intervals set in advance.

Then, the receiving section 5A confirms that the connection state with the card holder 3 is held, by receiving the notice from the card holder 3 again, transfers the transmitted user data D1 to the management section 5B, and notifies the management section 5B of the connection state with the card holder 3.

As a result, since the management section 5B can confirm the connection state between the receiving section 5A and the card holder 3 at predetermined time intervals, by updating the database of the user data D1 based on such a notice from the receiving section 5, the management section 5 can always select a certain access route to the user.

According to the above-mentioned configuration, by notifying the management section 5B of the ID peculiar to the user, which is read out from the IC card 2 by the terminal, via various routes accessible to the terminal, the management section 5B manages the access route to the user and the position of the terminal based on the access route, and selects a terminal in the targeted position of communication of the information supplied from the information origin 4. Thereby, the information can be certainly communicated to the targeted people of communication, thus the information communication system 1 that can remarkably improve reliability of information communication can be realized.

(9) Other embodiments

Further, although the case in which the present invention is applied to the information communication system 1 is described in the above-mentioned embodiment, the present invention is not limited to this case but can be applied to other various information communication systems, as long as the information communication system is capable of managing accessible communicating means to a user's or users' individual identification information in connection with each other and accessing the users having the individual identification information via the communicating means corresponding to the designated individual identification information.

Figure 13:
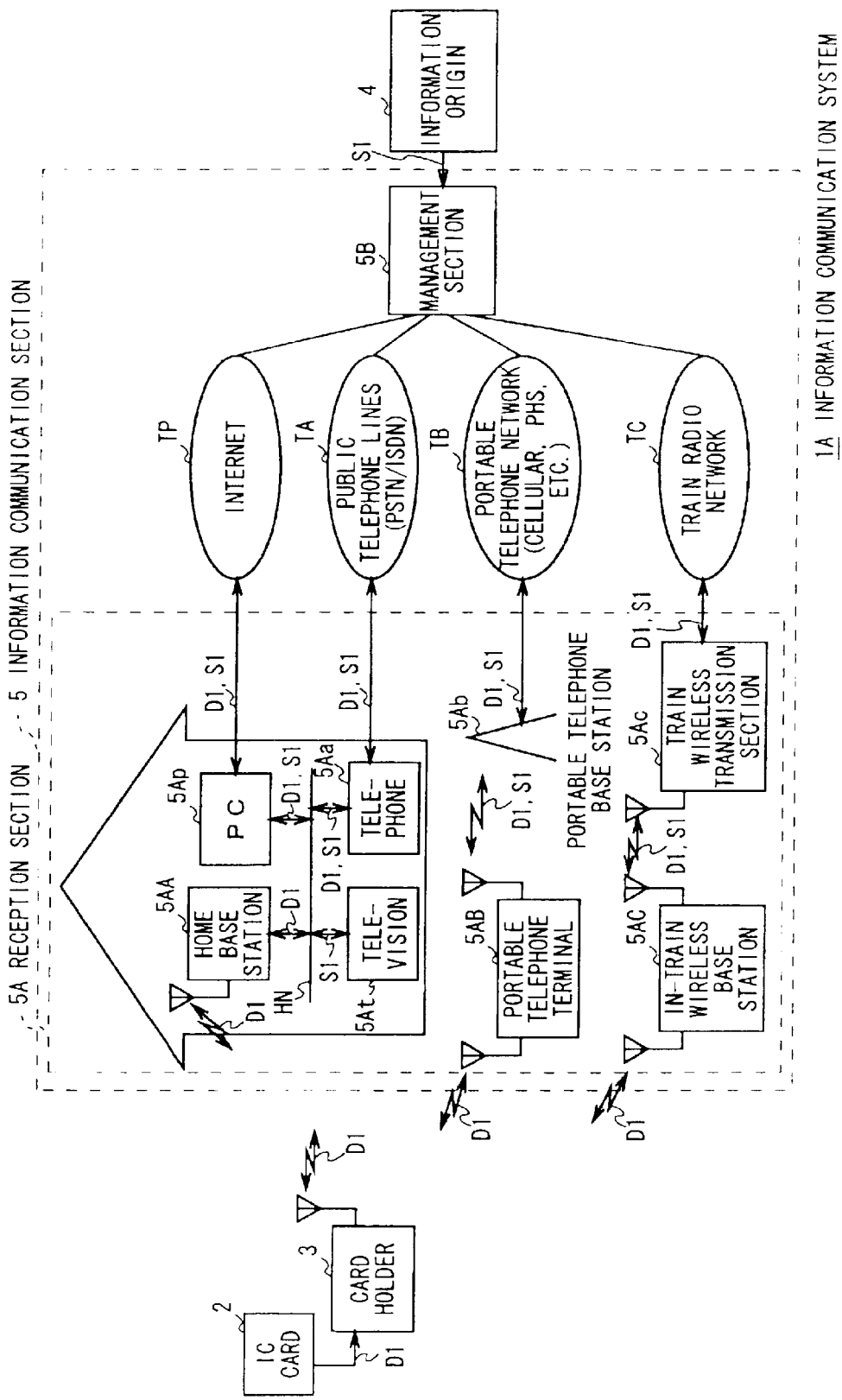
FIG. 13 is a block diagram showing a configuration of an information communication system according to another embodiment.

In this case, for example, in FIG. 13 in which the same reference numerals are given to the parts corresponding to those in FIG. 1, the present invention can be applied to an information communication system 1A. This information communication system 1A is configured entirely the same as the information communication system 1 of FIG. 1 except that an in-train wireless base station 5AC installed in a train when a user is on the train, a train wireless transmitting section 5Ac for transferring the user data D1 transmitted from the in-train wireless base station 5AC, and a train wireless network TC are installed as the receiving section 5A for receiving the user data D1 from the card holder 3.

Figure 14:
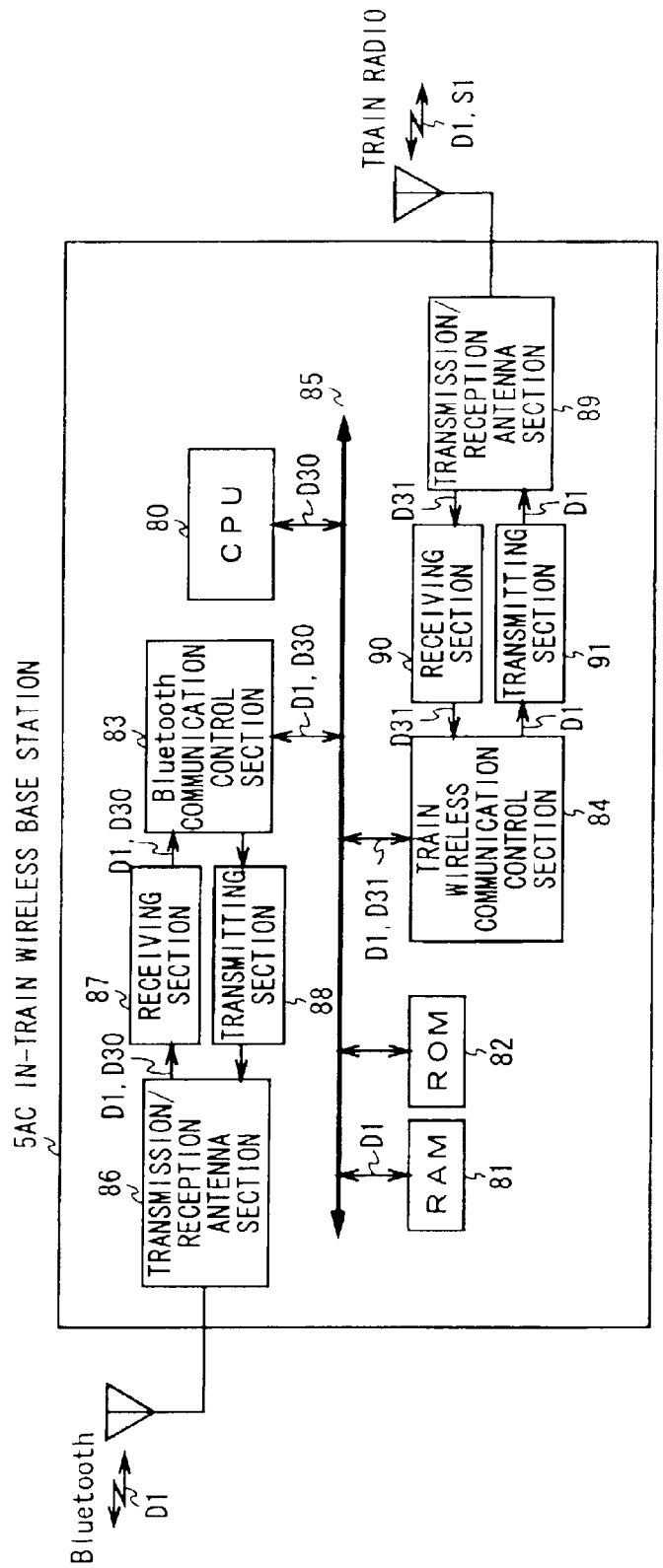
FIG. 14 is a block diagram showing a configuration of an in-train train wireless base station.

The in-train wireless base station 5AC is provided in practice, as shown in FIG. 14, with a CPU 80, an RAM 81, an ROM 82, a first communication control section 83 for the Bluetooth, and a second communication control section 84 for a train radio mutually connected to each other with a bus 85. And the first communication control section 83 and a first transmission/reception antenna section 86 for the Bluetooth connected to each other with a receiving section 87 and a transmitting section 88, and the second communication control section 84 and a second transmission/reception antenna section 89 for a train radio are connected to each other with a receiving section 90 and a transmitting section 91.

The CPU 80 causes the first transmission/reception antenna section 86 to retrieve the communicatable card holder 3 (FIGS. 1 and 3) by controlling the first communication control section 83. Then, when detecting the communicatable card holder 3, the first transmission/reception antenna section 86 gives it to the CPU 80 as detection data D30 sequentially via the receiving section 87 and the first communication control section 83.

The CPU 80 controls the first communication control section 83 based on the detection data D30, and received the user data D1 transmitted from the card holder 3, via the first transmission/reception antenna section 86 and takes it in the receiving section 87.

The receiving section 87, after applying predetermined input processing including data demodulation and the like to the user data D1, gives the data to the first communication control section 83. The first communication control section 83 gives the user data D1 given from the receiving section 87, to the RAM 81 and the second communication control section 84 through the bus 85 under the control of the CPU 80.

Then, the RAM 81 takes in the given user data D1 for a back-up of the data. In addition, the CPU 80 causes the second transmission/reception antenna section 89 to retrieve the communicatable receiving section 5A (FIG. 1) by controlling the second communication control section 84.

Then, when detecting the communicatable receiving section 5A, the second transmission/reception antenna section 89 gives it to the CPU 80 as detection data D31 sequentially via the receiving section 90 and the second communication control section 84. The CPU 80 reads out the user data D1 from the RAM 81 based on the detection data D31, and gives it to the transmitting section 91 via the second communication control section 84.

Then, the transmitting section 91, after applying predetermined output processing such as data modulation to the user data D1, transmits the data to the receiving section 5A of the information communication section 5 via the second transmission/reception antenna section 89.

In this way, the in-train wireless base station 5AC is configured such that the user data D1 received from the card holder 3 are transmitted to a management section 5B of the information communication section 5.

In this case, the information communication system 1A may be configured such that the management section 5B forwards various kinds of information S1 given from an information origin 4, to the in-train wireless base station 5AC sequentially via the train wireless network TC ad the train wireless transmitting section 5Ac, and communicates the various kinds of information S1 from the in-train wireless base station 5AC to a closest mobile telephone terminal 5AB or a card holder 3 that is originating the user data D1 of the corresponding ID.

Figure 15:
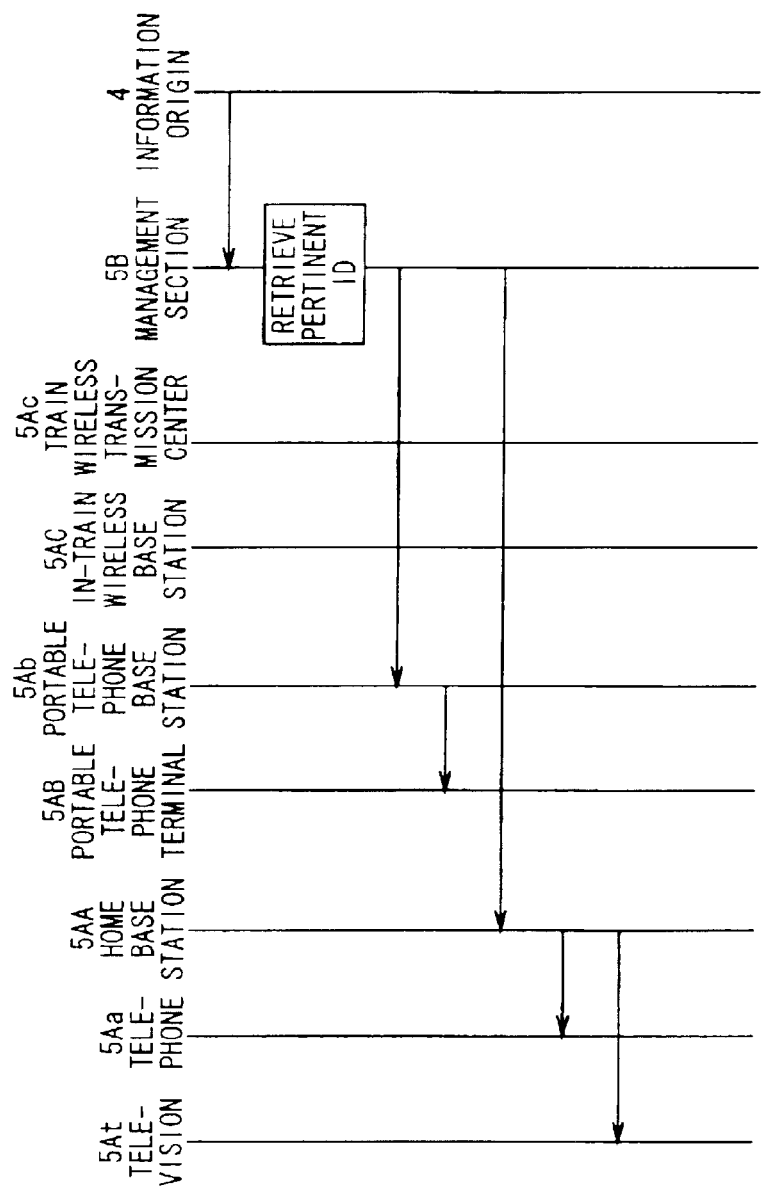
FIG. 15 is an arrow chart showing a situation of information distribution in an information communication system according to another embodiment.
Figure 16:
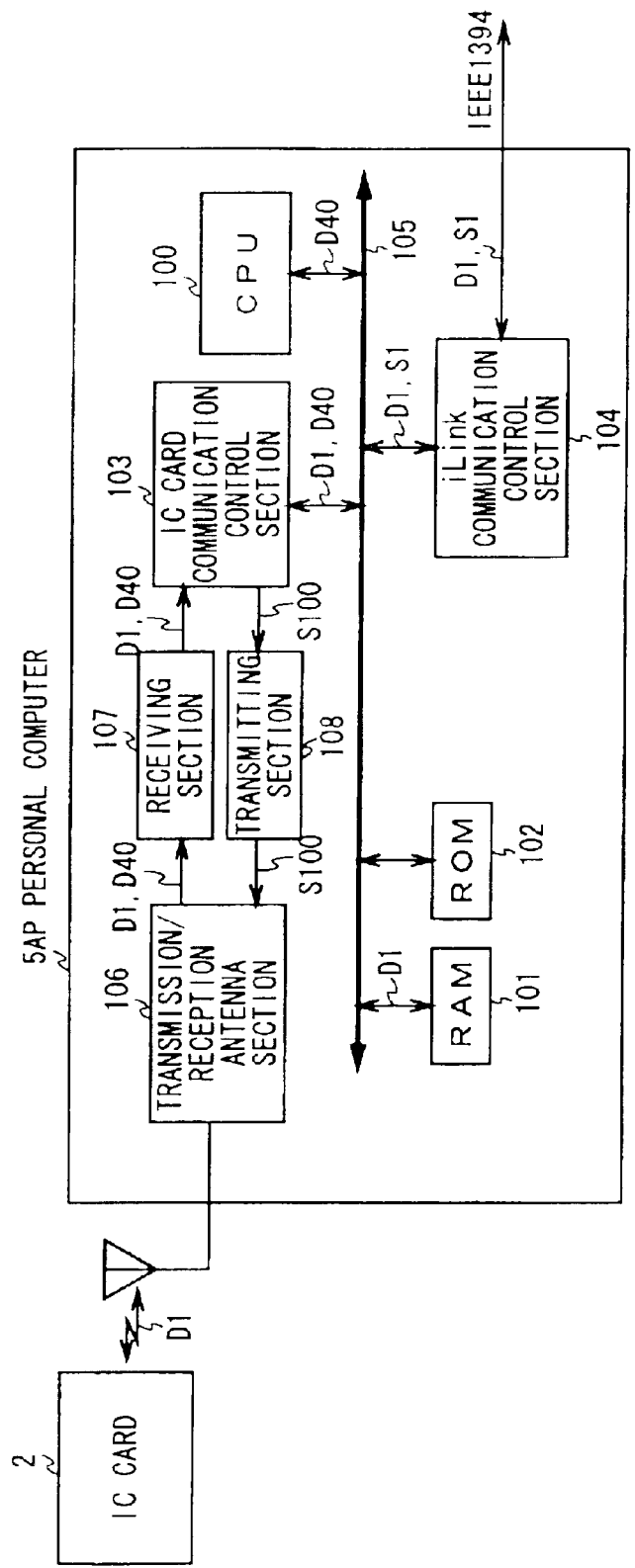
FIG. 16 is a block diagram showing a configuration of a personal computer according to another embodiment.

In this way, as shown in FIG. 15, the information communication system 1A is configured, when the management section 5B receives the various kinds of information S1 from the information origin 4, it retrieves a targeted user of information transmission based on an ID designated by the information origin 4 and, when the ID is retrieved by the home base station 5AA and the portable telephone base station 5Ab, the management section 5B accesses the home base station 5AA and the portable telephone base station 5Ab and communicates the various kinds of information S1 from the information origin 4 to a television 5At and a telephone 5Aa or a portable telephone terminal 5AB that are communicatable.

In addition, although the case in which the card holder 3 is applied as a terminal for reading out the user data D1 from the IC card 2 is described in the above-mentioned embodiment, the present invention is not limited to this case, but a season ticket holder which has a function of reading out the user data D1 by inserting an IC card 2 therein and informing the receiving means of this data can be used, as long as it is carried by a user and transmits individual identification information of the user which has been previously given. In addition, the IC card 2 is inserted into a portable telephone terminal directly and the receiving means can be informed of the user data D1 of the inserted IC card 2.

Further, although the present invention has described the case where the receiving section 5A is applied as the communicating means, the present invention is not limited to this but also other various kinds of communicating means can be used, as long as it has a communicating function of performing communication with outside via the Internet IP, the public telephone lines TA, and the portable telephone network TB which are predetermined communicating lines, and receives the individual identification information transmitted from a terminal.

Furthermore, in the aforementioned embodiments, although the management section 5B is used as managing means, the present invention is not limited to this but also other various kinds of managing means can be widely applied, as long as the managing means manages the individual identification information which is transmitted from the communicating means through a predetermined communicating line, and the communicating means in connection with each other when the communicating means receives the individual identification information, and accesses a user via the accessible communicating means based on the individual identification information designated by outside.

Moreover, although the case in which evacuation information at the time of occurrence of disaster is applied as the various information S1 to be communicated is described in the above-mentioned embodiment, the present invention is not limited to this case, but marketing information such as advertisement and other various kinds of information may be widely applied as information to be communicated.

Moreover, although the case in which the management section 5B communicates the various kinds of information S1 given from the information origin 4, to the telephone 5Aa, the personal computer 5Ap and the portable telephone terminal 5AB is described in the above-mentioned embodiment, the present invention is not limited to this case, but, as far as designated information is communicated to a specific user only, a communication method may be such that the various kinds of information S1 is communicated from the telephone 5Aa, the personal computer 5Ap and the portable telephone terminal 5AB to the card holder 3 using the Bluetooth. In this case, the card holder is provided with at least a display to display the communicated information.

Furthermore, although the case in which the user data D1 from the card holder 3 are received in the home base station 5AA at a user's home, and are transferred to the management section 5B using the telephone 5Aa and the personal computer 5Ap connected with the home network HN is described in the above-mentioned embodiment, the present invention is not limited to this case, but may be configured such that, for example, by providing a transmission/receiving section for the Bluetooth in the telephone 5Aa and the personal computer 5Ap, the user data D1 transmitted from the card holder 3 are received by the telephone 5Aa and the personal computer 5Ap directly.

In addition, as shown in FIG. 15, the user data D1 may be directly taken in from the IC card 2 using a personal computer 5AP provided with a dedicated driver for reading out the user data D1 from the IC card 2. In this case, in the personal computer 5AP, a CPU 100, an RAM 101, an ROM 102, a first communication control section 103 for the IC card 2, and a second communication control section 104 for the home network HN under the IEEE1394 are mutually connected to each other with a bus 105, and the first communication control section 103 and a transmission/reception antenna section 106 for the IC card 2 are connected to each other with a receiving section 107 and a transmitting section 10B.

Then, when the IC card 2 is inserted through an inserting opening (not shown) and an antenna incorporated in the IC card 2 and the transmission/reception antenna section 106 are in the communicatable state, the CPU 100 gives a read-out signal S100 for reading out the stored user data D1 from the IC card 2, to the IC card 2 via the transmitting section 108 and the transmission/reception antenna section 106, by controlling the first communication control section 103.

Incidentally, at this time, the IC card 2 is made to be supplied with power simultaneously with the data communication, based on the electromagnetic wave of the read-out signal S100 given from the personal computer 5AP.

In this way, the first communication control section 103 reads out the user data D1 stored in the IC card 2, from the IC card 2 via the transmission/reception antenna section 106, and gives the data to the receiving section 107.

After applying predetermined input processing such as data demodulation to the user data D1, the receiving section 107 takes the data in the RAM 101 sequentially via the first communication control section 103 and the bus 105 for a back-up.

In addition, the CPU 100 transfers the user data D1 given sequentially via the first communication control section 103 and the bus 105, to the telephone 5Aa (FIG. 1) via the home network HN by controlling the second communication control section 104.

Thereafter, the telephone 5Aa is made to forward the user data D1 transferred via the home network HN to the management section 5B through the public telephone lines TA.

In addition, as to the personal computer 5AP, the user data D1 taken in from the IC card 2 in this way can be forwarded to the management section 5B on the Internet TP.

In addition, when the various kinds of information S1 of the information origin 4 is received from the management section 5B, for example, if the user has the portable telephone 5AB in a usable state, the various kinds of information S1 can be communicated to the portable telephone terminal 5AB using the Bluetooth from the home base station 5AA, the telephone 5Aa and the personal computer 5Ap at the user's home as well.

Moreover, although the case in which the various kinds of information S1 supplied from the information origin 4 is communicated to the telephone 5Aa, the personal computer 5Ap or the portable telephone terminal 5AB is described in the above-mentioned embodiment, the present invention is not limited to this case, but various kinds of information may be displayed on the television 5At by superimposing a Telop and the like on a screen that a user is viewing via, for example, a cable television network, or may be communicated by superimposing the information on sounds and the like of a radio or music of an audio system that the user is listening to.

Moreover, although the case in which, only if the telephone 5Aa via the public telephone lines TA and the portable telephone terminal 5AB via the portable telephone network TB and the base station 5Ab of portable telephones are selected as an access route, the management section 5B can recognize the location of the user from the registered address of the telephone 5Aa or the position of the base station 5Ab of the portable telephone, is described in the above-mentioned embodiment, the present invention is not limited to this case, but the user's position may be detected by adding the GPS (Global Positioning System) function to the card holder 3, transferring the user's position information based on the function to the management section 5B and managing the user's position information.

Furthermore, in the above-mentioned embodiment, when receiving the various kinds of information S1 from the information origin 4 by the card holder 3, the telephone 5Aa, the personal computer 5Ap and the like, the user may prevent information with the same contents from being communicated redundantly by replying a predetermined confirmation number confirming the receipt to the information origin 4. However, concerning highly important information such as an emergency evacuation order, this is not applied, and identical information may be repeatedly communicated.

Furthermore, in the above-mentioned embodiment, when communicating information from the information origin 4, if there is a plurality of access routes at an identical level (sensitivity, etc.), the management section 5B may, by registering users' preferences in advance, select only an access route corresponding to the preference such as to call the portable telephone terminal 5AB prior to the telephone 5Aa at home. In this case, for example, in the portable telephone terminal 5AB, a method of incoming call may be further selected.

Moreover, when communicating information in this way, for example, if a user is participating in a chat with the personal computer 5Ap, the management section 5B may communicate the various kinds of information S1 from the information origin 4 by the VRML (Virtual Reality Markup Language).

Furthermore, although the aforementioned configuration has described the case where the management section 5B communicates the various kinds of information S1 given from the information origin 4, to the telephone 5Aa, the personal computer 5Ap and the portable telephone terminal 5AB, the present invention is not limited to this but also a communicating method of communicating information from the telephone 5Aa, the personal computer 5Ap and the portable telephone terminal 5AB to the card holder 3 using bluetooth can be applied if information can be communicated to specific users only.

INDUSTRIAL APPLICABILITY

The present invention can be applied to such an information communication system that information corresponding to a disaster in an emergency is communicated to people who have to receive, and an information communication system in which marketing information such as an advertisement is communicated to specific customers.

EXPLANATION OF REFERENCE NUMERALS 1, 1A . . . information communication system, 2 . . . IC card, 3 . . . card holder, 4 . . . information origin, 5 . . . information communication section, 5A . . . receiving section, 5B . . . management section, 5AA . . . home base station, 5Aa . . . portable telephone terminal, 5Aa . . . telephone, 5At . . . television, 5Ap . . . personal computer, 5Ab . . . portable telephone base station, TA . . . public telephone lines, TB . . . portable telephone network, TP . . . Internet, D1 . . . user data, S1 . . . various kinds of information.

What is claimed is:

1. An information communication system comprising:

a terminal which is carried by a user and originates individual identification information of said user that is given in advance;

communicating means for performing communication with outside via a corresponding plurality of predetermined communicating routes employing corresponding different transmission methods and for receiving said individual identification information originated from said terminal; and managing means for storing and managing said individual identification information, which is sent from said communicating means through one of said plurality of predetermined communicating routes via said corresponding transmission method, when said communicating means receives said individual identification information;

wherein said managing means accesses said terminal of said user via a best one of said communicating means, via said corresponding communicating route and transmission method, on the basis of said individual identification information received from said outside.

2. The information communication system according to claim 1, wherein said managing means controls said communicating means at predetermined time intervals.

3. The information communication system according to claim 1, wherein said communicating means controls said terminal at predetermined time intervals.

4. The information communication system according to claim 1, wherein:

a plurality of said communicating means and corresponding communicating route and transmission method are accessible to said user; and said managing means accesses each of the accessible communicating means, through said corresponding one or more predetermined communicating routes and communicating methods, on the basis of an indication of preferred communicating methods in said individual identification information received from said outside.

5. The information communication system according to claim 1, wherein said communicating means and/or managing means receive(s) only said predetermined individual identification information set in advance.

6. The information communication system according to claim 1, wherein:

said terminal comprises:

an IC card recording said individual identification information; and originating means for reading said individual identification information from said IC card, wherein said IC card protects the reading-out of said recorded individual identification information using a predetermined password set in advance.

7. The information communication system according to claim 1, wherein said communicating means informs said managing means of said individual identification information when a predetermined password set in advance is inputted.

8. The system of claim 1, wherein:

a plurality of said communicating means and corresponding different transmission methods are accessible to said user; and said managing means accesses a preferred one of said plurality of communicating means and corresponding transmission method in accordance with a communicating means and corresponding transmission method via which said individual identification information is received.

9. The system of claim 1, wherein:

a plurality of said communicating means and corresponding different transmission methods are accessible to said user; and said managing means accesses a preferred one of said plurality of communicating means and corresponding transmission method in accordance with a communicating means and corresponding transmission method on the basis of an indication of a preferred communicating method in said individual identification information.

10. An information communication method comprising the steps of:

receiving individual identification information of a user which is originated from a terminal carried by the user, with communicating means for performing communication with outside via a corresponding plurality of predetermined communicating routes employing corresponding different transmission methods;

storing and managing said individual identification information, which is transmitted from said communicating means through one of said plurality of predetermined communicating routes via said corresponding transmission method, when the communicating means receives said individual identification information; and accessing said terminal of said user via a best one of said communicating means, via said corresponding communicating route and transmission method, on the basis of said individual identification information received from said outside.

11. The information communication method according to claim 10, wherein:

in said storing and managing step, said communicating means is controlled at predetermined time intervals.

12. The information communication method according to claim 10, wherein:

a plurality of said communicating means and corresponding communicating route and transmission method are accessible; and in said accessing step, each of the accessible communicating means is accessed through said corresponding one or more predetermined communicating routes and communicating methods, on the basis of an indication of preferred communicating methods in said individual identification information received from said outside.

13. The information communication method according to claim 10, wherein:

in said receiving, and storing and managing steps, only said predetermined individual identification information set in advance is received and/or stored.

14. The information communication method according to claim 10, wherein:

said receiving step comprises:

a reading-out step of reading said individual identification information from said IC card in which said individual identification information is recorded with a terminal carried by a user; and an originating step of originating said read individual identification information from said terminal, wherein in said read-out step, said individual identification information recorded in said IC card is read out by inputting a predetermined password set in advance in said terminal.

15. The information communication method according to claim 10, wherein in storing and managing step, when a predetermined password set in advance is inputted to said communicating means at the time when the communicating means receives said individual identification information, the communicating means informs said managing means of said received individual identification information, through said corresponding one or more predetermined communicating routes to said managing means.

16. The method of claim 10, wherein:

a plurality of said communicating means and corresponding different transmission methods are accessible to said user; and said managing means accesses a preferred one of said plurality of communicating means and corresponding transmission method in accordance with a communicating means and corresponding transmission method via which said individual identification information is received.

17. The method of claim 10, wherein:

a plurality of said communicating means and corresponding different transmission methods are accessible to said user; and said managing means accesses a preferred one of said plurality of communicating means and corresponding transmission method in accordance with a communicating means and corresponding transmission method on the basis of an indication of a preferred communicating method in said individual identification information.

18. An information communication system, comprising:

a terminal for originating individual identification information of a user which is given in advance;

receiving means for receiving said individual identification information, which is originated from said terminal, informing a management section of the received individual identification information and performing communication with outside via a corresponding plurality of predetermined communication routes employing corresponding different transmission methods; and managing means provided in said management section, for managing a position of a corresponding user and managing accessible equipment to the user, on the basis of said individual identification information given from said receiving means via said corresponding transmission method;

wherein said managing means provides predetermined information to said user in a designated area via a best one of said accessible equipment and via said corresponding communicating route and transmission method, on the basis of the position of said corresponding user.

19. The information communication system according to claim 18, wherein said managing means provides said receiving means with said information in advance.

20. An information communication method, comprising the steps of:

originating individual identification information of a user given in advance in a terminal;

receiving said individual identification information originated in said terminal, and informing a management section of the received individual identification information;

performing communication with outside via a corresponding plurality of predetermined communication routes employing corresponding different transmission methods;

managing a position of a corresponding user and managing accessible equipment to the user, on the basis of said given individual identification information via said corresponding transmission method; and providing said user in a designated area, with predetermined information via a best one of said accessible equipment and via said corresponding communicating route and transmission method on the basis of the position of said corresponding user.

* * * * *